United States Patent
Nakazawa

(10) Patent No.: US 8,749,276 B2
(45) Date of Patent: Jun. 10, 2014

(54) SIGNAL BUFFER CIRCUIT, SENSOR CONTROL BOARD, IMAGE SCANNER, AND IMAGE FORMING APPARATUS

(75) Inventor: Masamoto Nakazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 74 days.

(21) Appl. No.: 13/251,548

(22) Filed: Oct. 3, 2011

(65) Prior Publication Data

US 2012/0092732 A1  Apr. 19, 2012

(30) Foreign Application Priority Data

Oct. 13, 2010   (JP) .................................. 2010-230829

(51) Int. Cl.
  *H03L 5/00*   (2006.01)
(52) U.S. Cl.
  USPC ................ 327/108; 327/333; 326/61; 326/80
(58) Field of Classification Search
  USPC ................ 327/100, 108, 306, 333, 365, 405; 326/166, 80, 61
  See application file for complete search history.

(56) References Cited

U.S. PATENT DOCUMENTS

| | | | | |
|---|---|---|---|---|
| 3,780,321 A | * | 12/1973 | Lentz | 327/542 |
| 4,858,015 A | * | 8/1989 | Furrey | 315/1 |
| 5,576,723 A | | 11/1996 | Asprey | |
| 5,721,594 A | * | 2/1998 | Gurley et al. | 348/707 |
| 5,731,594 A | * | 3/1998 | Kuroda et al. | 250/504 R |
| 7,821,682 B2 | | 10/2010 | Nakazawa et al. | |

FOREIGN PATENT DOCUMENTS

| | | |
|---|---|---|
| JP | 3012310 | 12/1999 |
| JP | 4565567 | 8/2010 |

OTHER PUBLICATIONS

The Extended European Search Report issued Feb. 23, 2012, in Europe Application No. / Patent No. 11184817.2-1522.

* cited by examiner

*Primary Examiner* — Dinh T. Le

(74) *Attorney, Agent, or Firm* — Oblon, Spivak, McClelland, Maier & Neustadt, L.L.P.

(57) ABSTRACT

A signal buffer circuit includes a buffer to conduct a buffering operation for transmitting a signal to a subsequent unit; a resistor connected between an input side and an output side of the buffer; and a variable impedance device connected in series to the output side of the buffer. The variable impedance device is at low impedance when the buffer is conducting the buffering operation and at high impedance when the buffer is not conducting the buffering operation.

21 Claims, 19 Drawing Sheets

R ≪ Rr, Reb
Rr : DIODE INSULATION RESISTANCE
Reb : BASE-EMITTER INSULATION RESISTANCE

R ≪ Rr, Reb
Rr : DIODE INSULATION RESISTANCE
Reb : BASE-EMITTER INSULATION RESISTANCE

SIGNAL BUFFER CIRCUIT, SENSOR CONTROL BOARD, IMAGE SCANNER, AND IMAGE FORMING APPARATUS

CROSS-REFERENCE TO RELATED APPLICATIONS

This application claims priority to Japanese Patent Application No. 2010-230829, filed on Oct. 13, 2010 in the Japan Patent Office, which is incorporated by reference herein its entirety.

BACKGROUND OF THE INVENTION

1. Field of the Invention

The present invention relates to a signal buffer circuit, a sensor control board including the signal buffer circuit, an image scanner including the signal buffer circuit and sensor control board, and an image forming apparatus including the image scanner.

2. Description of the Background Art

Scanners receive light reflected from a document image face (hereinafter, document), and then the light is photo-electrically converted to electrical signals using an image sensor such as a charge coupled device (CCD) installed in a sensor control board, by which an image of the document is read, or scanned. In the sensor control board, signals output from the CCD are buffered by a signal buffer circuit employing an emitter follower circuit, and then the signals are input to an analog processing circuit such as an analog-front-end (AFE) via alternating current (AC) coupling. At this time, during transitional operations, such as power source ON/OFF, or clock input or shutdown, over-output or under-output from the CCD or signal disruption occurs, leading to excess voltage or excess current at the AFE.

In view of such problem, conventional methods use an emitter follower circuit disposed before the AFE to block signals or limit the signal amplification so as to prevent the occurrence of over-voltage or over-current at the AFE. For example, JP-2007-214688-A discloses a method to suppress over-voltage to the AFE, in which the power source of the emitter follower circuit is delayed to shut off a transistor, as a result of which signals output from the CCD are not transmitted to the AFE and the over-voltage at the AFE is prevented. Although successful at preventing over-voltage or over-current at the AFE, such conventional methods using the emitter follower circuit to shut down or limit signals have a drawback in that over-voltage (or reverse bias voltage) occurs at the emitter follower circuit itself that shuts down or limits the signals.

SUMMARY

In one aspect of the present invention, a signal buffer circuit is devised. A signal buffer circuit includes a buffer to conduct a buffering operation for transmitting a signal to a subsequent unit; a resistor connected between an input side and an output side of the buffer; and a variable impedance device connected in series to the output side of the buffer. The variable impedance device is at low impedance when the buffer is conducting the buffering operation and at high impedance when the buffer is not conducting the buffering operation.

In another aspect of the present invention, a signal buffer circuit is devised. A signal buffer circuit includes a buffer to conduct a buffering operation for transmitting a signal to a subsequent unit; a first variable impedance device connected between an input side and an output side of the buffer, the first variable impedance device is at a high impedance when the buffer is conducting the buffering operation, and the first variable impedance device is at a low impedance when the buffer is not conducting the buffering operation; and a second variable impedance device connected in series to the output side of the buffer, the second variable impedance device is at a low impedance when the buffer is conducting the buffering operation, and the second variable impedance device is at a high impedance when the buffer is not conducting the buffering operation.

In another aspect of the present invention, a signal buffer circuit is devised. The signal buffer circuit includes a buffer to conduct a buffering operation for transmitting a signal to a subsequent unit; first means connected between an input side and an output side of the buffer; and second means connected in series to the output side of the buffer. The second means is at low impedance when the buffer is conducting the buffer operation and at high impedance when the buffer is not conducting the buffering operation.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
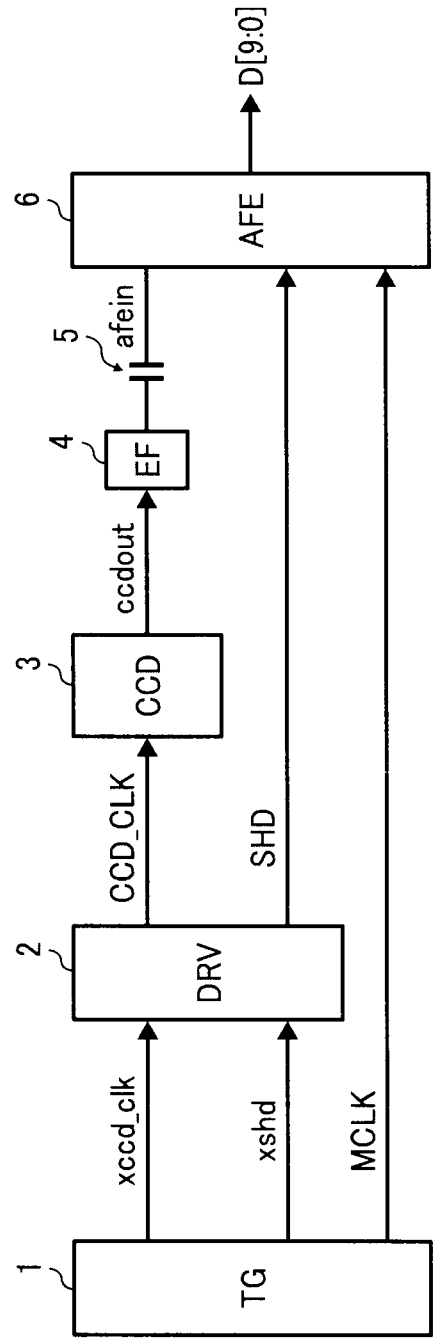
FIG. 1 shows a circuit diagram of conventional sensor control board.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, a circuit or control board according to example embodiments is described below.

A sensor control board according to example embodiments may include a charge coupled device (CCD), a signal buffer circuit, and an analog processing circuit such as analog-front-end (AFE), in which an over-voltage (or opposite bias voltage) to a signal buffer circuit such as an emitter follower circuit can be prevented and a shutdown condition can be set at the signal buffer circuit.

To understand the present invention, a scanner mounting a conventional sensor control board is explained first. Specifically, a signal flow in the conventional sensor control board and a problem of the conventional sensor control board are explained with reference to FIG. 1 to FIG. 6. FIG. 1 shows a circuit diagram of a conventional sensor control board, in which a timing generator (TG) and an analog processing circuit such as analog-front-end (AFE) are configured as different chips, but the TG can be installed in the AFE.

A scanner having such sensor control board obtains light reflected from the document, and then a CCD disposed in the sensor control board conducts a photo-electric conversion to convert the light to electrical signals to read or scan document image. The sensor control board or unit may include a timing generator (TG) 1, a CCD driver 2 (DRV 2) such as a driver integrated circuit (IC), a CCD 3, a signal buffer circuit 4, a capacitor 5, and an analog front end (AFE) 6.

The TG 1 generates various clock signals and gate signals. Among such signals, a CCD drive signal (xccd_clk), which is a signal to drive the CCD 3, is input to the CCD 3 via DRV 2. Then, the CCD 3 outputs an analog image signal (ccdout), and the analog image signal is buffered at the signal buffer circuit 4 configured with an emitter follower circuit (EF), and is then input to the AFE 6 via an alternative current (AC) coupling by the capacitor 5.

The CCD 3, which is a linear image sensor, photo-electrically converts the light reflected from the document into analog image signals based on the CCD drive signal transmitted from the TG 1, and outputs the analog image signals to the AFE 6.

The AFE 6 conducts various analog processing operations on the analog image signals. Specifically, the AFE 6 conducts a sample-hold operation, a clamp operation, an offset correction operation, and a signal amplification operation. Finally, the AFE 6 conducts an analog/digital (A/D) conversion to output digital image data, in which a signal (xshd) output from the TG 1 is supplied to the AFE 6 as a sample-hold signal (SHD) via the DRV 2. Further, a master clock (MCLK) output from the TG 1 is supplied to the AFE 6.

Figure 2:
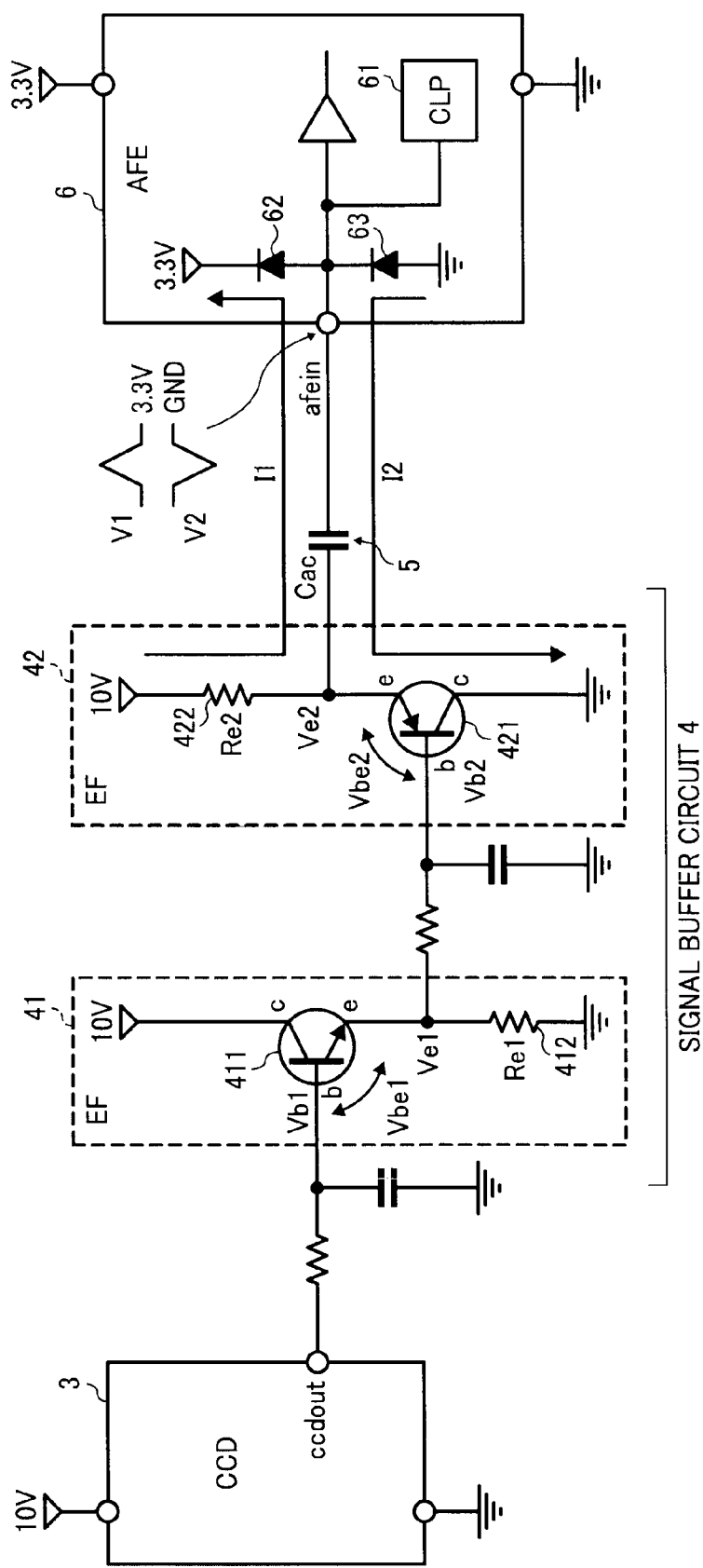
FIG. 2 shows a circuit diagram of a first example configuration of main circuit of the sensor control board of FIG. 1.

FIG. 2 shows a circuit diagram of a first example configuration of main circuit of the sensor control board of FIG. 1. Generally, an emitter follower circuit is used for the signal buffer circuit 4 disposed for the CCD 3. To decrease the impedance effectively, as shown in FIG. 2 for example, an emitter follower circuit (EF) 41 using an npn transistor 411 and an emitter follower circuit (EF) 42 using a pnp transistor 421 are sequentially arranged. As such, a two-stage configuration is set for EF, but the number of EFs is not limited two.

As for the first stage EF 41, an electrical resistor (hereinafter, resistor) such as an emitter resistor 412 is disposed or interposed between the emitter of the npn transistor 411 and ground (GND). The resistance Re1 of the emitter resistor 412 regulates the signal fall through-rate, by which a signal fall response speed becomes slow. Further, as for the second stage EF 42, a signal rising response speed becomes similarly slow, but if a clamp circuit 61 (CLP 61) in the AFE 6 is operated, a time constant determined by the resistance Ret of an emitter resistor 422, interposed between a power source (10V) and an emitter of the pnp transistor 421, and an AC coupling capacitance Cac of the capacitor 5 together determine the signal rising response speed, which may be only about several milliseconds (ms) or so. Such signal response speed may not cause a problem under normal conditions, in which image signals within a given design level are input.

In contrast, when the driving condition of CCD 3 is in a transitional state such as when the power source is to be set to ON/OFF, when the clock output starts/stops, and when a driving timing is changed, signals output from the CCD 3 become the over-output or under-output, or signal disruptions occurs at the CCD 3. A signal, which is output from the CCD 3 at the transitional state, differs greatly from a signal output during normal operation. For example, as for the direct current (DC) at the transitional state, a signal may be continuously output at one level in the range of the power source (10V to GND), and as for the alternate current (AC) at the transitional state, a signal changes with great amplification/high speed at pixel order in the range of the power source (10V to GND), in which the signal increases and decreases with great amplification such as from 10 V to GND, which is unthinkable under normal conditions.

The power source used for the CCD 3 and the power source used for the AFE 6 are different power sources. For example, the power source of 10V is used for the CCD 3, and the power source of 3.3 V is used for the AFE 6. Therefore, without consideration to the AFE 6, the output signal of the CCD 3 is input to the AFE 6 under such transitional state. At the transitional state, which is too different from the normal condition, the output signal output from the CCD 3 causes the over-voltage (V1, V2) to the AFE 6, or the over-current flow (I1, I2) to the AFE 6, and further, the over-voltage occurs at the EFs 41 and 42, in which the opposite bias voltage occurs at Vbe1 between the base-emitter (b-e) of the transistors 411 and at Vbe2 between the base-emitter (b-e) of the transistors 421. The opposite bias means that the current flows in an opposite direction compared to a current-flow direction under a normal condition of device. Although the device can be used even if the opposite bias occurs, the opposite bias may degrade the device. Therefore, it is desirable to suppress such opposite bias.

The over-voltage/over-current occurs at the AFE 6 because the output signal output from the CCD 3 is input to the AFE 6 via the AC coupling of the capacitor 5, in which an amount of a signal change at the CCD 3 is transmitted to the AFE 6. Further, the over-voltage (or opposite bias voltage) of the EF 41 or the EF 42 occurs when a signal change level exceeds the responsiveness of the EF 41 or EF 42, in which the emitter voltage Ve1 or Ve2 cannot follow the base voltage Vb1 or Vb2.

The configuration of FIG. 2 does not cause the opposite bias voltage at the EF 41 because the responsiveness of the EF 41 is effectively fast when the signal is rising and going down. However, as for the EF 42, the signal rising responsiveness becomes slow such as up to several milliseconds (ms) when the power source is to be set to ON while the clamp circuit 61 is set at the ON condition because the AC coupling capacitance (up to several µF) is charged (the ON condition of the clamp circuit 61 can be cancelled by the initial setting), which means the opposite bias voltage at the time of signal rising becomes a problem.

The signal fall responsiveness is effectively fast due to a discharge via the pnp transistor 421, by which the opposite bias voltage at the time of signal fall does not become a problem. The operation of clamp circuit 61 shifts to a normal operation by the initial setting (clamp circuit 61 is set ON only for a certain time period of one line). Therefore, during the time period from the power source ON to initial setting, the signal rising responsiveness becomes slow, and during the time period from the normal condition (scan-waiting condition) to the power source OFF, the signal rising responsiveness becomes fast.

Figure 3:
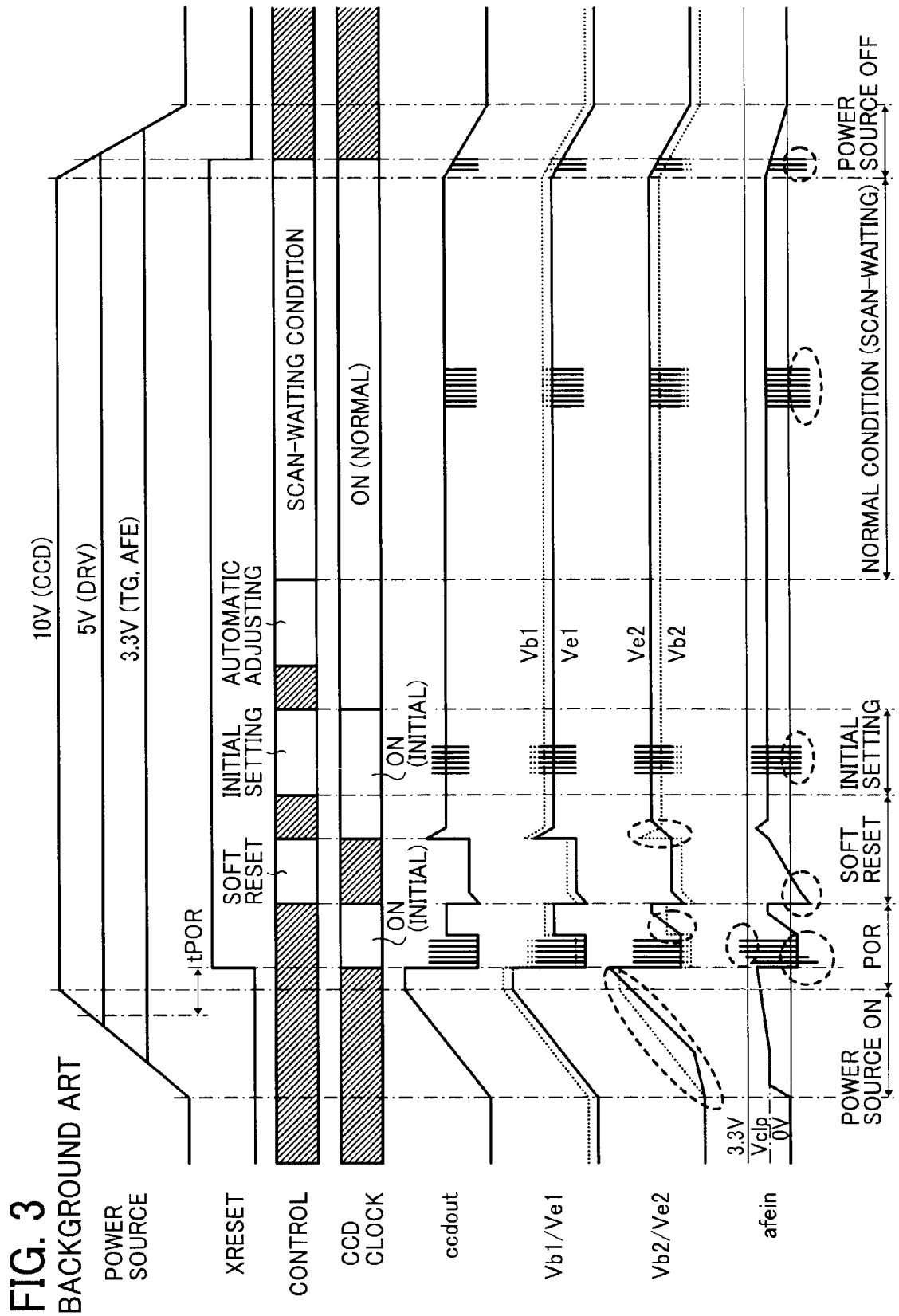
FIG. 3 shows a timing chart to explain voltage levels in the sensor control board of FIG. 1 having the circuit of FIG. 2 through an operation sequence.

FIG. 3 shows a timing chart to explain voltage levels in the sensor control board (FIG. 1) including a circuit shown in FIG. 2 through the operation sequence, in which the over-voltage at the AFE 6, and the EFs 41 and 42 due to the output signal disruptions of the CCD 3 in the sensor control board are shown. In the following drawings, the over-voltage and opposite or reverse bias may be indicated by encircled areas using the dotted line, and the signal disruption may be indicated by vertical straight lines.

In the operation sequence of the sensor control board, when the power sources for the CCD 3, the DRV 2, the TG 1, and the AFE 6 are to be set to ON, the power source (e.g., power source of 10 V) is detected and when a time period of tPOR (time to power on reset) elapses after the detection of the power source, a reset signal of XRESET is cancelled. The XRESET is input to the TG 1 and the AFE 6, and when the XRESET is Low (low level), the reset condition is set, and when the XRESET is High (high level), the reset is cancelled.

When the reset condition is cancelled, the TG 1 and the AFE 6 start to operate. Then, a reset condition is set again using a software instruction from a CPU (soft reset). This software-control reset is set to prevent a resetting when the power flicker occurs to the power source. When the soft reset is cancelled, a register is set (at the initial setting) to set the TG 1 and the AFE 6 at the normal operation. Then, the automatic adjustment for the AFE 6 such as gain adjustment is conducted, by which the system shifts to the scan-waiting condition.

When the power source is to be set to the OFF condition, no specific control is conducted basically. When an instruction of power-source OFF (e.g., power source 10V is to be set to OFF) is detected, the XRESET is set to the reset condition, and the power source gradually becomes OFF.

During the time period of reset (XRESET at low level), the CCD clock is not output from the TG 1. After the cancellation of XRESET, the CCD clock, determined for the initial condition of register (hard default) is output. During the time period of soft reset, the CCD clock is not output. Then, the CCD clock is set to the clock phase/width, which is normally used, by the initial setting, and becomes the CCD clock for the normal condition, and then the condition shifts to the scan-waiting condition.

When the power source is to become OFF, the CCD clock is being output until the reset is set. When the reset is set, the output of CCD clock is stopped, and then power source becomes OFF.

During the time period that the power source ON is set to ON (CCD clock:OFF), the output of CCD 3 (ccdout) increases to a level close to the power source voltage of 10 V, which is an over-output condition. Such over-output condition may occur because the charge detection capacity in the CCD 3 may leak to the power source via a reset/clamp transistor when the CCD clock is not input to the CCD 3. In some case, the charge detection capacity in the CCD 3 may leak to ground (GND), in which the output of CCD 3 (ccdout) becomes the under-output, which is close to the GND (0 V).

The over-output increases in response to the rising of power source voltage, which may increase with a speed of such as several milliseconds (ms) as shown in FIG. 3. Because the signal rising responsiveness of the EF 42 is slow at a same level or more of power source, the voltage Ve2 of the EF 42 cannot follow the base voltage Vb of the EF 42, by which the opposite bias voltage occurs between the base-emitter (b-e) of the EF 42. After the cancellation of XRESET, the output signal of CCD 3 disrupts (see the time period of POR of FIG. 3). This is caused because the output signal of CCD 3 becomes the normal offset level (e.g., 5 V or so) and charges accumulated during the time period of reset are discharged. Such change occurs as signal down change with a greater amplification/high speed. Because the responsiveness of EF 41 is fast, the emitter voltage Ve1 can follow the base voltage Vb1, by which the opposite bias voltage does not occur between the base-emitter of EF 41.

Further, because the fall response of the EF 42 is fast, the opposite bias voltage caused by the signal disruptions does not occur to the EF 42. However, the opposite bias voltage occurs during the period of signal rising such as when changing to the normal offset level (i.e., time period of POR in FIG. 3).

Further, such signal disruption is also transmitted to the AFE 6, by which the over-voltage exceeding the power source (3.3 V) or GND occurs at the input side of the AFE 6 (V1 and V2 of FIG. 2). Further, when internal diodes 62 and 63 used as protection diodes 62 and 63 become the ON condition, the over-current (I1 and I2 of FIG. 2) occurs.

Similarly, the transitional operation occurs during the time period of soft reset such as change of clock signal (clock output→clock stop→clock output resume) occurs, and the transitional operation occurs during the time period of initial setting such as change of setting of CCD clock occurs (initial setting value→normal setting value), in which the output signal of CCD 3 disrupts (see the time period of soft reset and the time period of initial setting in FIG. 3). Therefore, during such transitional state, the over-voltage occurs at the EF 42 and the AFE 6.

Under the scan-waiting condition (or normal condition), the over-voltage may not occur usually. However, when external light enters suddenly, an output exceeding an expected output level (e.g., great amplification and high speed change of signal down direction) is output from the CCD 3, the over-voltage occurs at the AFE 6 (see the time period of normal condition of FIG. 3). Because the rising/falling responsiveness is secured for the EFs 41 and 42 during the normal condition, the opposite bias voltage does not occur to the EFs 41 and 42.

Further, when the power source (10 V) of the CCD 3 is being shifted to OFF, the output signal of the CCD 3 disrupts until the reset condition is set (see the time period of power source OFF and XRESET=High in FIG. 3). This may be caused because the charge injection occurs from the power source of CCD 3 to a charge detection unit of the CCD 3. Because such signal down change occurs with a great amplification/high speed, the over-voltage occurs at the AFE 6. This over-voltage phenomenon occurs to the output of the CCD 3 only when a CCD clock signal is being input to the CCD 3. Therefore, when a reset condition is set, in which the CCD clock stops, the over-voltage does not occur.

However, even at the reset condition, when the switching such as from clock-output to clock-stop occurs, or the power source is switched to OFF, the output signal of the CCD 3 disrupts, by which the over-voltage similarly occurs at the AFE 6 (see the time period of power source OFF and XRESET=Low in FIG. 3). Because the rising/falling responsiveness is secured for the EFs 41 and 42 during such situation, the opposite bias voltage does not occur to the EFs 41 and 42.

As such, the over-voltage/over-current occurs at the AFE 6 and the EFs 41 and 42 due to the signals output from the CCD 3 when the CCD 3 is at transitional state, which is not the normal condition such as when the power source is to be set to ON or OFF. Further, even if the CCD 3 is operated under the normal condition, a sudden enter of irregular light to the CCD 3 also causes the over-voltage/over-current at the AFE 6 and the EFs 41 and 42.

Figure 4:
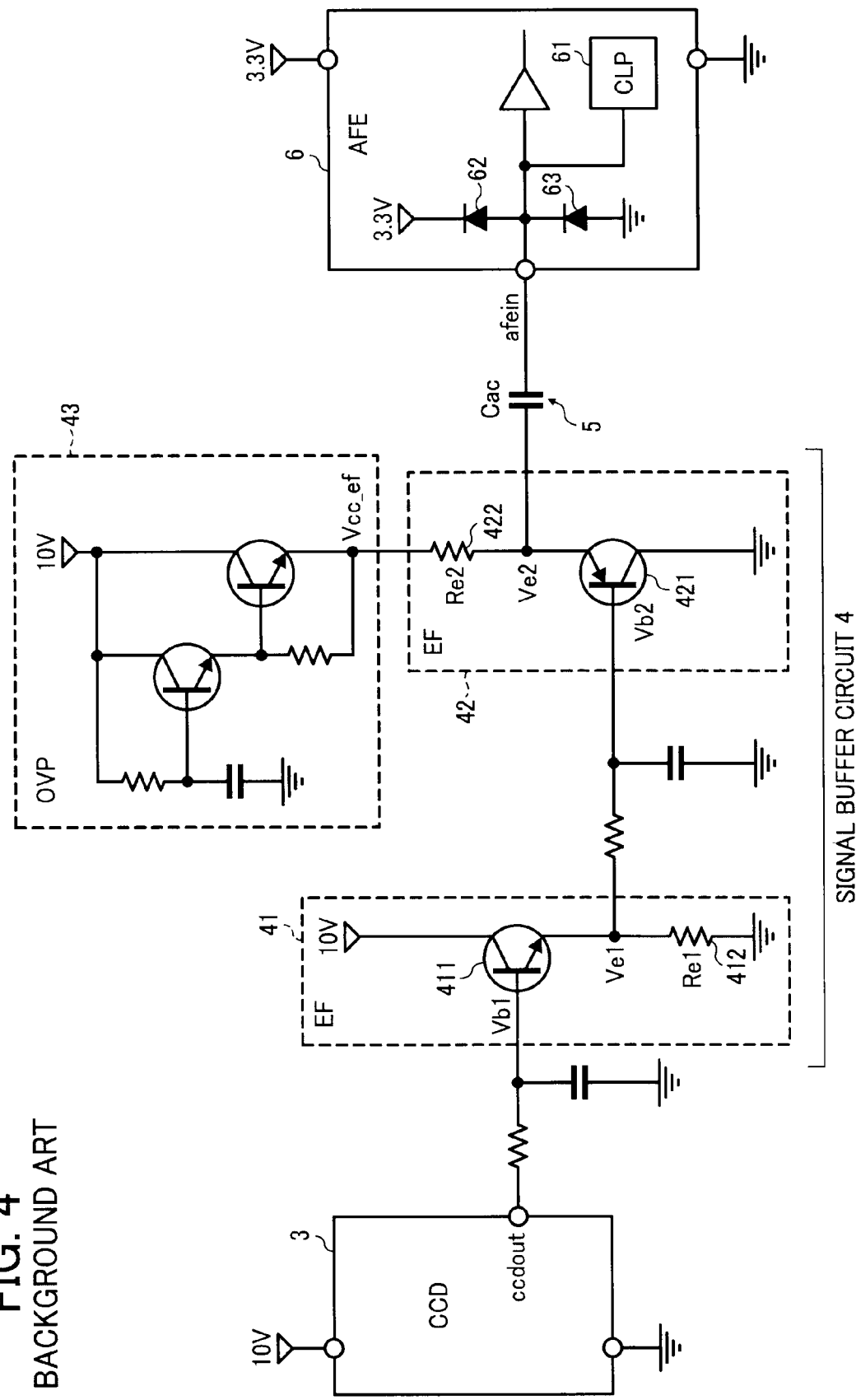
FIG. 4 shows a circuit diagram of a second example configuration of main circuit of the sensor control board of FIG. 1.

FIG. 4 shows a circuit diagram of a second example configuration of main circuit of the sensor control board of FIG. 1, and same reference characters and numbers in FIG. 2 are used for the same parts in FIG. 4. A conventional method to prevent the over-voltage at the AFE 6 uses a configuration to delay the power source 10V of the EF 42 as shown in FIG. 4, which is disclosed in JP-2007-214688-A. An over-voltage protection (OVP) circuit is disposed as shown in FIG. 4.

In a configuration of FIG. 4, when the power source (10V) is input or supplied, the power source Vcc_ef for EF 42 can be slowly raised using a delay circuit 43 used as an over-voltage protection circuit. The delay circuit 43 may be referred to an over-voltage protection (OVP) circuit such as OVP 43, hereinafter.

When the Vcc_ef is to be raised, because the Vcc_ef at such timing is smaller than output signal of the CCD 3 (ccdout), a condition of "Vb2>Ve2" is set, which means the pnp transistor 421 of the EF 42 becomes a shutdown condition, and thereby the disruption of output signal of the CCD 3 can be blocked by the EF 42. Further, even if the condition of "Vb2<Ve2" is set, only a signal change corresponding to a difference of Vb2 and Ve2 is transmitted to the EF 42, and thereby the signal change at the AFE 6 during the time period of power source ON can be reduced.

With such a configuration, the over-voltage at the AFE 6 can be prevented. Usually, the number of EFs is set equal to the number of output signals of CCD (e.g., RGB, Even/Odd), and the Vcc_ef shown in FIG. 4 is connected to each of the plurality of channels. Therefore, to prevent the electrical crosstalk between the channels, the OVP 43 may employ an emitter follower configuration using a Darlington pair, by which the output impedance of Vcc_ef can be effectively set small.

Figure 5:
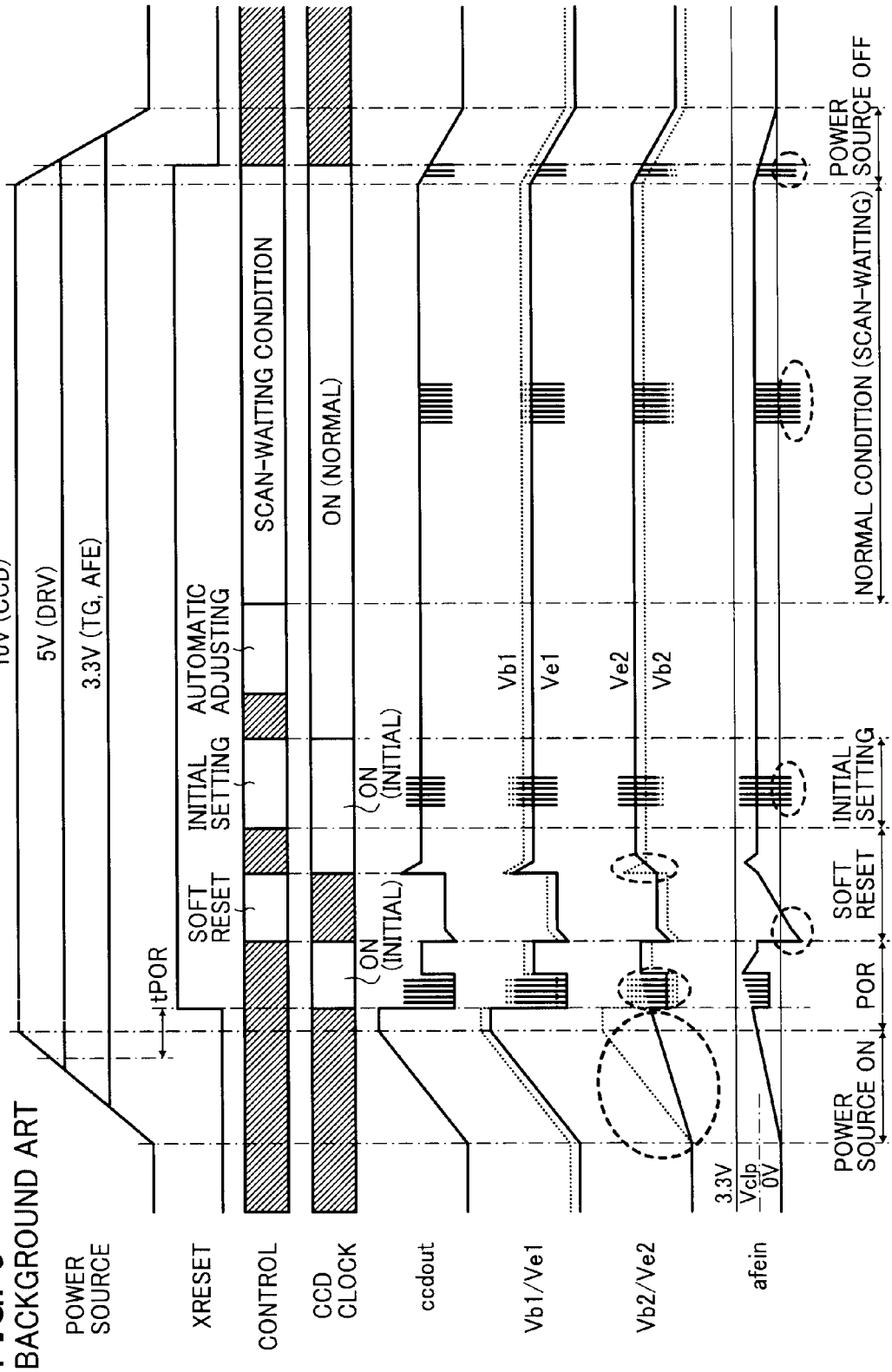
FIG. 5 shows a timing chart to explain voltage levels in the sensor control board of FIG. 1 having the circuit of FIG. 4 through the operation sequence.

FIG. 5 shows a timing chart to explain voltage levels in the sensor control board (FIG. 1) including the circuit of FIG. 4 through the operation sequence, in which the over-voltage at the EF 42 due to the disruption of output signal of the CCD 3 is shown. In a case of FIG. 5, because the Vcc_ef is being changed during the time period from the power source ON to POR (power on reset), the over-voltage at the AFE 6 during such time period can be reduced.

However, in such a situation, because the opposite bias voltage is intentionally applied to the base-emitter of the pnp transistor 421 configuring the EF 42 to set the shutdown condition of the EF 42, the over-voltage at the EF 42 occurs due to such opposite bias voltage, which is not desirable.

Especially, when a transistor for high speed signal is used, the base width is set small to reduce a parasitic capacitance and base resistance, by which the dielectric strength between the base-emitter of transistor against the opposite bias voltage is relatively small such as several volts (V), and thereby the above described opposite bias voltage at the pnp transistor 421 becomes a problem.

Further, by setting the EF 42 at the shutdown condition (Vb2>Ve2) during the time period of raising the Vcc_ef, a signal flow to the AFE 6 can be blocked. However, after the Vcc_ef is raised to the normal level, there is no effect of over-voltage protection, and thereby the over-voltage at the AFE 6 during the time period of the normal condition or power source OFF cannot be prevented.

As above described, the signal flow to the AFE 6 can be blocked by setting the EF 42 at the shutdown condition (Vb2>Ve2). However, when Vb2<Ve2 is set, a signal change corresponding to the difference of Vb2 and Ve2 is transmitted to the AFE 6. Which means, to completely block the signal flow to the AFE 6, the delay time of Vcc_ef needs to be set long so that the EF 42 can be shut down for a long timer. However, in such situation, the fluctuation of delay time becomes great.

Theoretically, the Vcc_ef needs to be raised to the normal voltage level at the time of the automatic adjustment. However, in such situation that the fluctuation of delay time becomes great, the Vcc_ef may not be activated to the normal voltage level for some devices, by which the system-down occurs. Therefore, it becomes difficult to set a long time for the delay time. Resultantly, when a control such as soft reset and initial setting is conducted after a given time elapses after setting the power source ON, the occurrence of over-voltage cannot be prevented.

Figure 6:
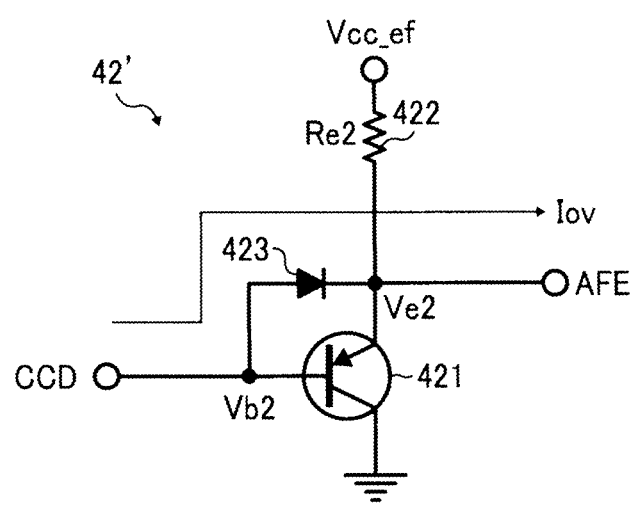
FIG. 6 shows a circuit diagram of an EF improved from the EF of FIG. 4.

FIG. 6 shows a circuit diagram of EF 42' improved from the EF 42 of FIG. 4. In this example case, the EF 42' may use, for example, a diode clamp shown in FIG. 6 to prevent the opposite bias voltage that may occur to the EF 42 shown in FIG. 4. Specifically, the EF 42' has a diode 423 added between the base-emitter of the pnp transistor 421 shown in the EF 42 of FIG. 4. In the circuit configuration of the EF 42', when the opposite bias voltage is to occur between the base-emitter of the pnp transistor 421, the diode 423 is set to ON, by which the voltage between the base-emitter becomes a forward voltage Vf, and the opposite bias voltage can be suppressed at a level of forward voltage Vf.

However, because the input side of the EF 42' is connected to the CCD 3 via the EF 41 and the output side of the EF 42' is connected to the AFE 6 via the AC coupling of the capacitor 5, a current flow path such as "CCD 3-EF 41-diode 423-AFE 6" is formed in the circuit configuration of FIG. 6, by which the current by flows in the circuit. Accordingly, the over-output signal of the CCD 3 is transmitted to the AFE 6, by which the over-voltage/over-current occurs at the AFE 6. In this case, the over-current at the AFE 6 flows also from the CCD 3, by which the over-current also occurs at the CCD 3.

Hereinafter, a description is given of a signal buffer circuit according to example embodiments, which can solve the above described problem in the conventional arts.

Figure 7:
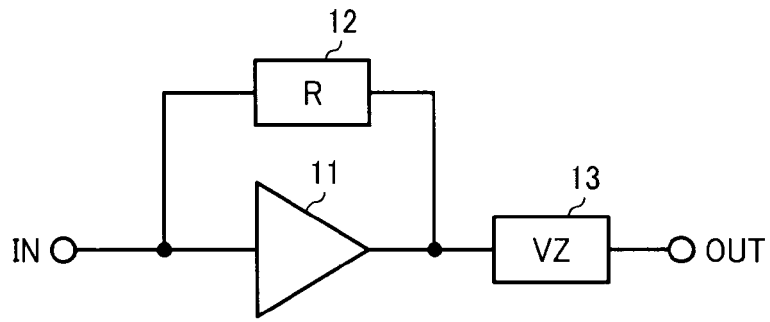
FIG. 7 shows a schematic circuit diagram of a signal buffer circuit according to a first example embodiment.

FIG. 7 shows a schematic circuit diagram of signal buffer circuit according to a first example embodiment. The signal buffer circuit of FIG. 7 can prevent the opposite bias voltage using a circuit configuration having a resistor (R) 12 of high resistance, connected between the input side (IN) and output side (OUT) of a buffer 11, and a variable impedance device (VZ) 13 connected to the output side of the buffer 11 in a serial manner, wherein the impedance of variable impedance device can be changed variably. (hereinafter, the between of the input side (IN) and output side (OUT) may be referred to as between input-output side or between input/output).

The variable impedance device 13 becomes a low impedance condition (ON condition) when the buffer 11 is at the ON condition (i.e., buffering operation is active), and the variable impedance device 13 becomes a high impedance condition (OFF condition) when the buffer 11 is at the OFF condition (i.e., buffering operation is not active and the opposite bias voltage occurs between the input/output of the buffer 11). With such a configuration, the over-voltage at the signal buffer circuit, which may be caused by the over-output or under-output of the CCD 3 and signal disruptions of the CCD 3, can be suppressed.

Figure 8:
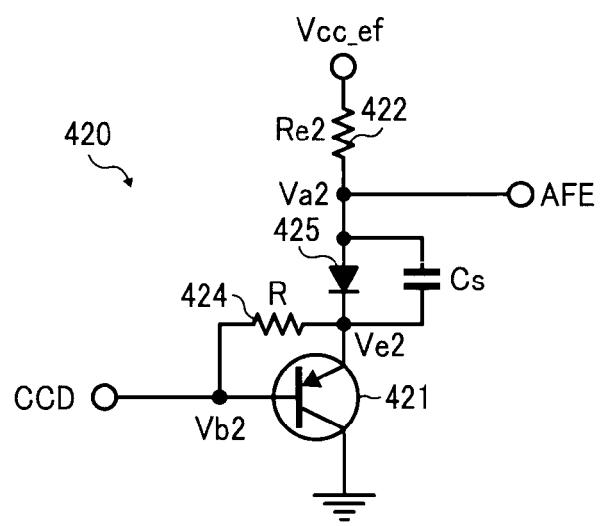
FIG. 8 shows an example circuit diagram of EF used in the signal buffer circuit of FIG. 7.

A description is given of one example of signal buffer circuit of FIG. 7, which is configured using an emitter follower circuit (EF) 420 shown in FIG. 8. FIG. 8 shows a circuit diagram of EF, and same reference characters and numbers in FIG. 6 are used for the same parts in FIG. 8. The EF 420 of FIG. 8 is used for the signal buffer circuit 4 instead of the EF 42 shown in FIG. 4.

The EF 420 includes a resistor 424 and a diode 425 as shown in FIG. 8. The resistor 424 having a high resistance corresponds to the R12 (FIG. 7), and the diode 425 corresponds to the variable impedance device 13 (FIG. 7) that can change the impedance.

In the EF 420, the resistor 424 is disposed in a parallel manner with respect to the base-emitter of the pnp transistor 421. Therefore, the impedance, when the opposite bias voltage occurs between the base-emitter, is a combined resistance of the resistance R of the resistor 424 and the insulation resistance Reb between the base-emitter of the pnp transistor 421.

The insulation resistance Reb between the base-emitter of the pnp transistor 421 is typically several MΩ to several tens MΩ. The resistance R of the resistor 424 is smaller than the insulation resistance Reb, and is set to a constant value that does not affect the normal operation of the EF (emitter follower circuit), by which the resistance R of the resistor 424 becomes about several tens kΩ to several hundreds kΩ. Therefore, the impedance when the opposite bias voltage occurs between the base-emitter of the pnp transistor 421 can be determined by the resistance R of the resistor 424, in which the impedance becomes a level of several tens kΩ to several hundreds kΩ.

Further, with a configuration using the OVP 43 (FIG. 4), the power source Vcc_ef becomes a low voltage. Therefore, the diode 425 becomes the shutdown condition, wherein the insulation resistance Rr of the diode 425 is typically several MΩ to several tens MΩ. In such a situation, if the opposite bias voltage is to occur between the base-emitter of the pnp transistor 421, the opposite bias voltage occurs between the base Vb2 of the pnp transistor 421 and the anode Va2 of the diode 425. Because the impedance between the base-emitter of the pnp transistor 421 is effectively smaller than the insulation resistance Rr of the diode 425, almost all of the opposite bias voltage occurring to the Vb2-Va2 is applied to the diode 425, and the opposite bias voltage does not substantially occur between the base-emitter of the pnp transistor 421.

By inducing the opposite bias voltage to the diode 425 having a high dielectric strength, occurrence of the opposite bias voltage between the base-emitter of the pnp transistor 421 can be prevented. This can be attained because the diode 425 has a simple pn junction, and thereby the dielectric strength of the diode 425 for the opposite bias voltage becomes high such as several tens volts (V). In contrast, the pnp transistor 421 has a small base width to achieve high speed performance, by which the dielectric strength between the base-emitter of the pnp transistor 421 for the opposite bias voltage is typically only several volts (V) or so. Further, the capacitance Cs connected in a parallel manner with the diode 425 indicates a parasitic capacitance of the diode 425.

When the EF 420 is at the non-emitter-follower operation (i.e., when the opposite bias voltage occurs), the diode 425 becomes the OFF condition and at the high impedance condition. When the EF 420 is at the emitter-follower operation, the diode 425 becomes the ON condition and at the low impedance condition. Therefore, the EF 420 does not affect the emitter-follower operation (i.e., normal operation) itself.

As above described, as for the EF 420 shown in FIG. 8, the opposite bias voltage between the base-emitter of the pnp transistor 421 can be prevented. Further, a signal flow to a subsequent unit such as the AFE 6 can be shut down while preventing the opposite bias voltage between the base-emitter of the pnp transistor 421, and the over-voltage at the EF 420 and over-voltage/over-current at the AFE 6 can be prevented simultaneously. Therefore, a signal buffer circuit that can easily suppress the opposite bias voltage between the base-emitter of the pnp transistor 421 can be provided.

Although the diode is used as the variable impedance device, other switching device such as a transistor, a metal-oxide-semiconductor field-effect transistor (MOSFET) or the like can be used with a similar effect. Further, although the pnp transistor is used for the emitter follower circuit, the npn transistor can be used with a similar effect.

Figure 9:
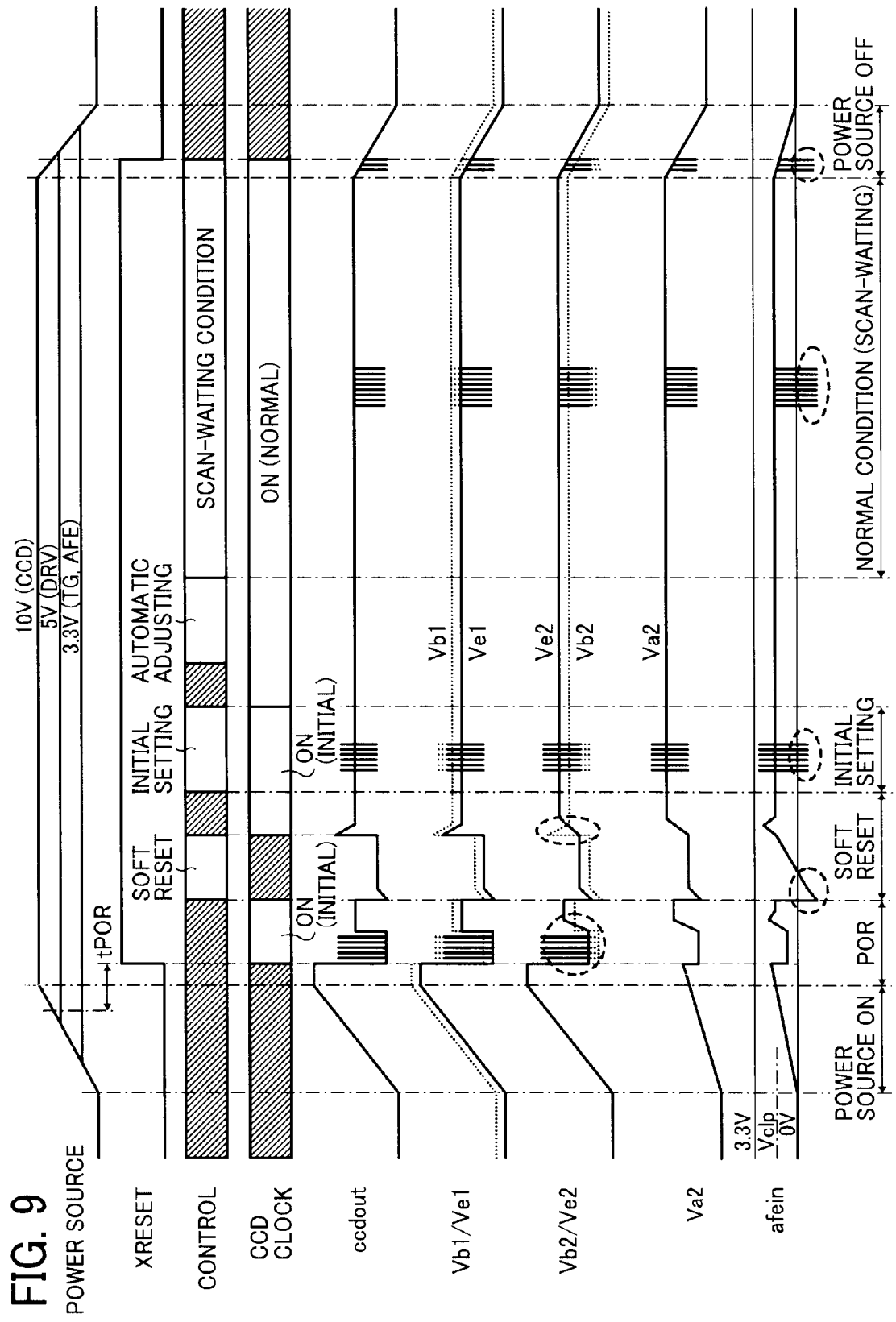
FIG. 9 shows a timing chart to explain voltage levels in the sensor control board employing the circuit of FIG. 7 and the EF of FIG. 8 through the operation sequence.

FIG. 9 shows a timing chart to explain voltage levels in the sensor control board (see FIG. 1) through the operation sequence, in which the EF 42 included in the circuit of FIG. 4 is replaced by the EF 420 of FIG. 8. FIG. 9 shows voltage levels at each part in the sensor control board having the EF 420 of FIG. 8 through the operation sequence. When compared with FIG. 5, the anode voltage Va2 of diode 425 is added in FIG. 9.

In FIG. 5, the opposite bias voltage occurs between the base (Vb2)-emitter (Ve2) of the pnp transistor 421 during the time period of power source ON. As for the circuit configuration of FIG. 8, because the emitter voltage Ve2 of the pnp transistor 421 can follow the base voltage Vb2 of the pnp transistor 421, the opposite bias voltage does not occur between the base-emitter of the pnp transistor 421 during the time period of power source ON as shown in FIG. 9. Because the opposite bias voltage is applied to both end of the diode 425 (Ve2-Va2) having a high dielectric strength, the opposite bias voltage does not become a problem during the time period of power source ON.

Figure 10:
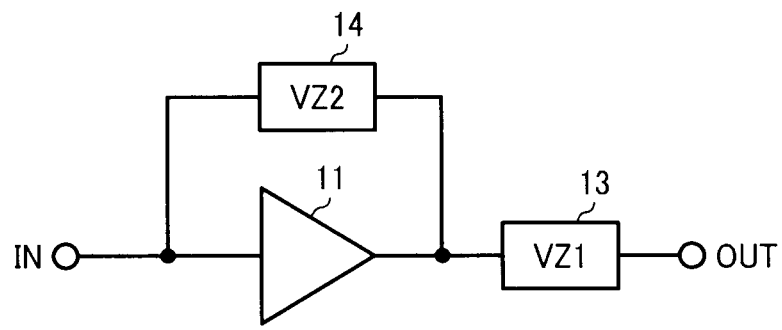
FIG. 10 shows a schematic circuit diagram of a signal buffer circuit according to an second example embodiment.

FIG. 10 shows a schematic circuit diagram of signal buffer circuit according to a second example embodiment, and same reference characters and numbers in FIG. 7 are used for the same parts in FIG. 10. The circuit configuration of FIG. 8 using the EF 420 can prevent the opposite bias voltage only when a high voltage is constantly output from the CCD 3 (FIG. 4) or when the signal changes gently. The circuit configuration of FIG. 8 has such property because the responsiveness of the emitter with respect to the base in the pnp transistor 421 has some limitation when the opposite bias voltage occurs.

In the configuration of FIG. 8, because the diode 425 has the parasitic capacitance Cs equivalently, a low-pass filter composed of high resistance R and parasitic capacitance Cs can be formed. Because the high resistance R has a resistance of several tens kΩ to several hundreds kΩ, and the parasitic capacitance Cs of the diode 425 is several pF to ten and several pF, the bandwidth of low-pass filter becomes narrow compared to the output signal of the CCD 3, which is in the order of several MHz to several tens MHz or several tens to several hundreds nanoseconds (ns).

Therefore, when the opposite bias voltage occurs due to a high speed change of output signal of the CCD 3, the emitter voltage Ve2 of the pnp transistor 421 cannot follow the base voltage Vb2 of the pnp transistor 421, by which the opposite bias voltage occurs between the base-emitter of the pnp transistor 421.

Due to such limitation, as shown in FIG. 9, the opposite bias voltage can be prevented only during the time period of power source ON because the signal changes gently in such time period. Further, during the time period of POR and soft reset, the Ve2 cannot follow a sharp change of Vb2 (e.g., signal rising change) due to the high speed change of output signal of the CCD 3.

In view of such situation, a signal buffer circuit shown in FIG. 10 is devised to prevent the opposite bias voltage which may occur due to a high speed change of signal. Specifically, a first variable impedance device such as a variable impedance device 14 (VZ2) that can change impedance is connected between the input side and output side of the buffer 11, and a second variable impedance device such as a variable impedance device 13 (VZ1) that can change impedance is connected to the output side of the buffer 11 in a serial manner.

When the buffer 11 is at the ON condition (i.e., buffering operation is activated), the variable impedance device 13 is at the low impedance condition, and when the buffer 11 is at the OFF condition (i.e., buffering operation is not activated and the opposite bias voltage occurs between the input/output of the buffer 11), the variable impedance device 13 is at the high impedance condition.

On one hand, when the buffer 11 is at the ON condition (i.e., buffering operation is activated), the variable impedance device 14 is at the high impedance condition, and when the buffer 11 is at the OFF condition (i.e., buffering operation is not activated: the opposite bias voltage occurs between the input/output of the buffer 11), the variable impedance device 14 is at the low impedance. With such a configuration, even if the signal changes with a high speed, the over-voltage at the signal buffer circuit, which may be caused by the over-output or under-output of the CCD 3 and signal disruptions of the CCD 3, can be suppressed.

Figure 11:
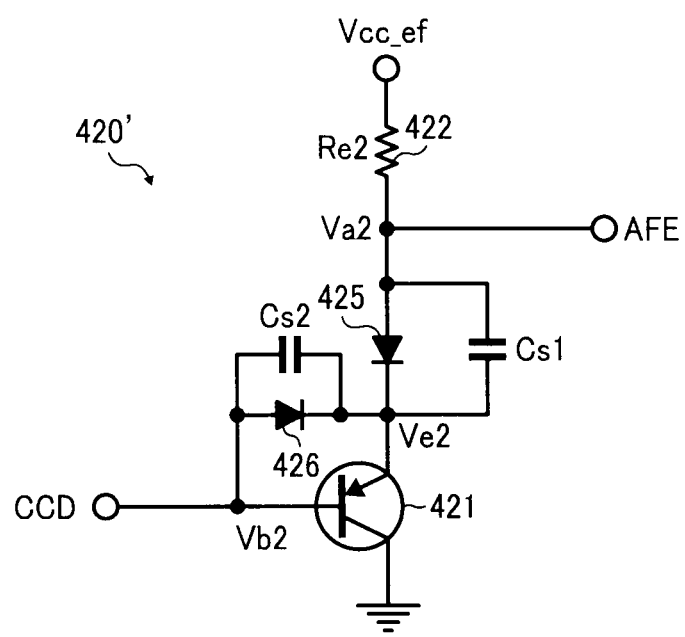
FIG. 11 shows an example circuit diagram of EF used in the signal buffer circuit of FIG. 10.

A description is given of an example of signal buffer circuit of FIG. 10, which is configured using an emitter follower circuit (EF) shown in FIG. 11. FIG. 11 shows a circuit diagram of EF 420', and same reference characters and numbers in FIG. 8 are used for the same parts in FIG. 11. The EF 420' of FIG. 11 is used for the signal buffer circuit 4 instead of the EF 42 shown in FIG. 4.

The EF 420' includes a diode 425 corresponding to the variable impedance device 13, and a diode 426 corresponding to the variable impedance device 14. The basic operation of the EF 420' is similar to the operation of the EF 420 of FIG. 8, and the resistor 424 having high resistance in FIG. 8 is replaced by the diode 426 in a configuration of FIG. 11. Therefore, in FIG. 11, the impedance between the base-emitter of the pnp transistor 421 become a level of the ON resistance or so of the diode 426 such as several compared to the impedance between the base-emitter of the pnp transistor 421 in FIG. 8, which is the high resistance R such as several tens KΩ to several hundreds KΩ.

As for the circuit configuration of FIG. 11 having the EF 420', by inducing the opposite bias voltage, which is to be occur between the base-emitter of the pnp transistor 421, to the diode 425 having a high dielectric strength, the opposite bias voltage between the base-emitter of the pnp transistor 421 can be prevented. The opposite bias voltage between the base-emitter becomes a level of the forward voltage of the diode 425 such as from 0.6 V to 0.7 V at most.

The impedance between the base-emitter of the pnp transistor 421 can be set to a low impedance such as several Ω by using the diode 426, by which even if the parasitic capacitance Cs1 for the diode 425 exists, the lowering of bandwidth can be prevented.

As such, the responsiveness of emitter with respect to the base of the pnp transistor 421 when the opposite bias voltage occurs is not limited. Further, even if the opposite bias voltage occurs due to the high speed change of signal output from the CCD 3, the opposite bias voltage to the EF 420' can be effectively prevented.

On one hand, as similar to the EF 420 of FIG. 8, when the EF 420' is conducting the emitter-follower operation, the diode 425 is at the ON condition and becomes the low impedance condition. Therefore, the EF 420' does not affect the emitter-follower operation (i.e., normal operation) itself.

Further, the diode 426 disposed between the base-emitter of the pnp transistor 421 is at the OFF condition and becomes the low impedance condition when the EF 420' is conducting the emitter-follower operation. Therefore, the diode 426 does not also affect the emitter-follower operation (i.e., normal operation) itself.

Further, when the EF 420' is conducting the emitter-follower operation, the ON condition is set between the base-emitter of the pnp transistor 421, and because of same potential as alternate current, the parasitic capacitance Cs2 for the diode 426 does not also affect the emitter-follower operation itself.

As above described, as for the EF 420' of FIG. 11, with irrelevant to a signal changing speed, the opposite bias voltage between the base-emitter of the pnp transistor 421 can be prevented. Therefore, a signal flow to a subsequent unit such as the AFE 6 can be shut down while preventing the opposite bias voltage between the base-emitter of the pnp transistor 421, and with irrelevant to the signal changing speed, the over-voltage at the EF 420' and over-voltage/over-current at the AFE 6 can be prevented simultaneously. Therefore, a signal buffer circuit that can easily suppress the opposite bias voltage between the base-emitter of the pnp transistor 421 even if the signal changes at high speed can be provided.

Although the diode is used as the variable impedance device, other switching device such as a transistor, a metal-oxide-semiconductor field-effect transistor (MOSFET) or the like can be used with a similar effect. Further, although the pnp transistor is used for the emitter follower circuit, the npn transistor can be used with a similar effect.

Figure 12:
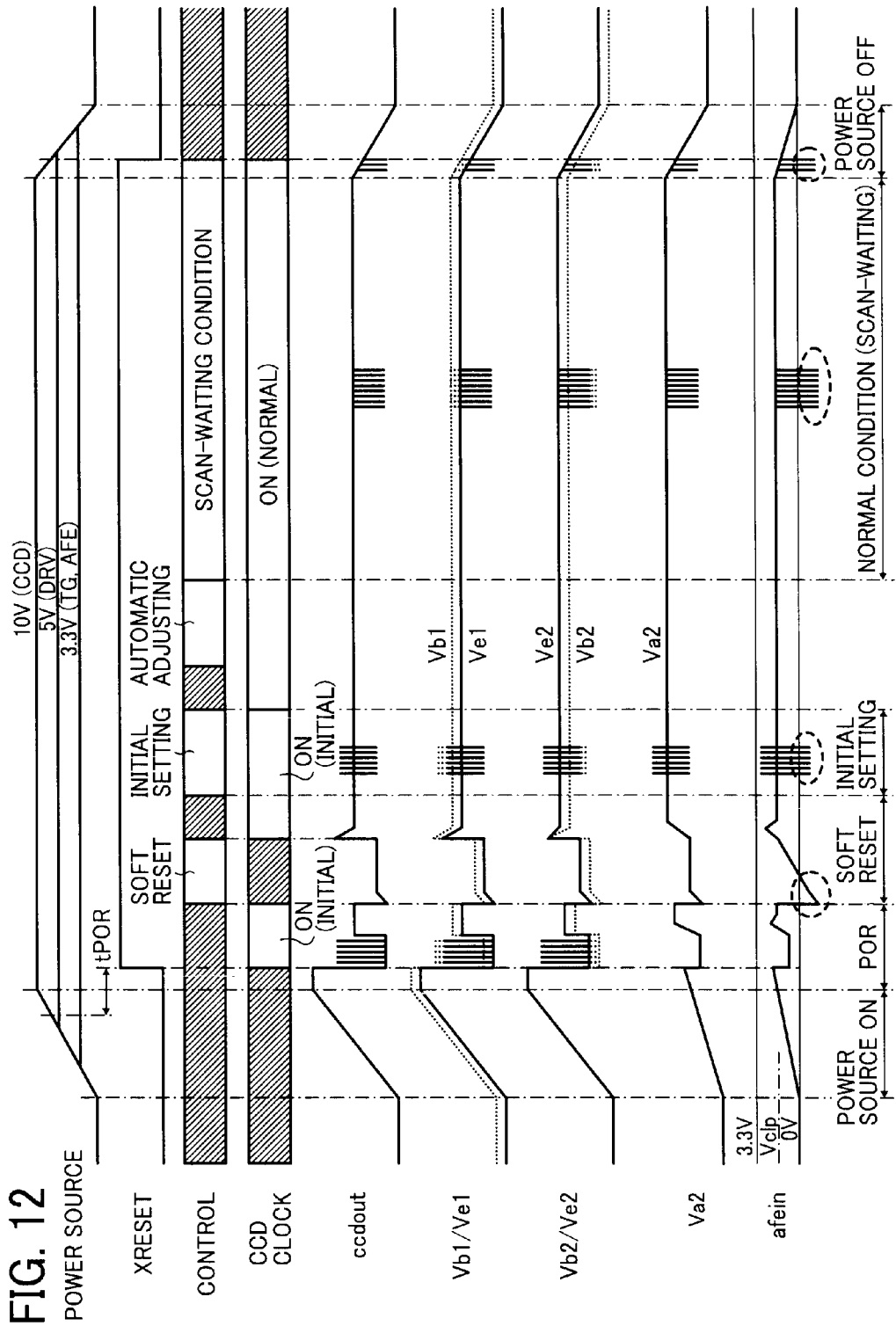
FIG. 12 shows a timing chart to explain voltage levels in the sensor control board employing the circuit of FIG. 10 and the EF of FIG. 11 through the operation sequence.

FIG. 12 shows a timing chart to explain voltage levels in the sensor control board (FIG. 1) through the operation sequence, in which the EF 420' of FIG. 11 replaces the EF 42 in the circuit of FIG. 4.

In FIG. 9, the opposite bias voltage occurs between the base (Vb2)—emitter (Ve2) of the pnp transistor 421 during the time period of POR and soft reset due to a sharp rising of signal. As for the circuit configuration of FIG. 11, even if a sharp rising of signal occurs, because the emitter voltage Ve2 of the pnp transistor 421 can follow the base voltage Vb2 of the pnp transistor 421, the opposite bias voltage does not occur between the base-emitter of the pnp transistor 421 as shown in FIG. 12. Further, as similar to FIG. 9, the opposite bias voltage occurs to both end of the diode 425 (Ve2-Va2) having a high dielectric strength, and thereby the opposite bias voltage does not become a problem. With such a configuration, with irrelevant to signal changing speed, the opposite bias voltage at the pnp transistor 421 can be prevented.

Figure 13:
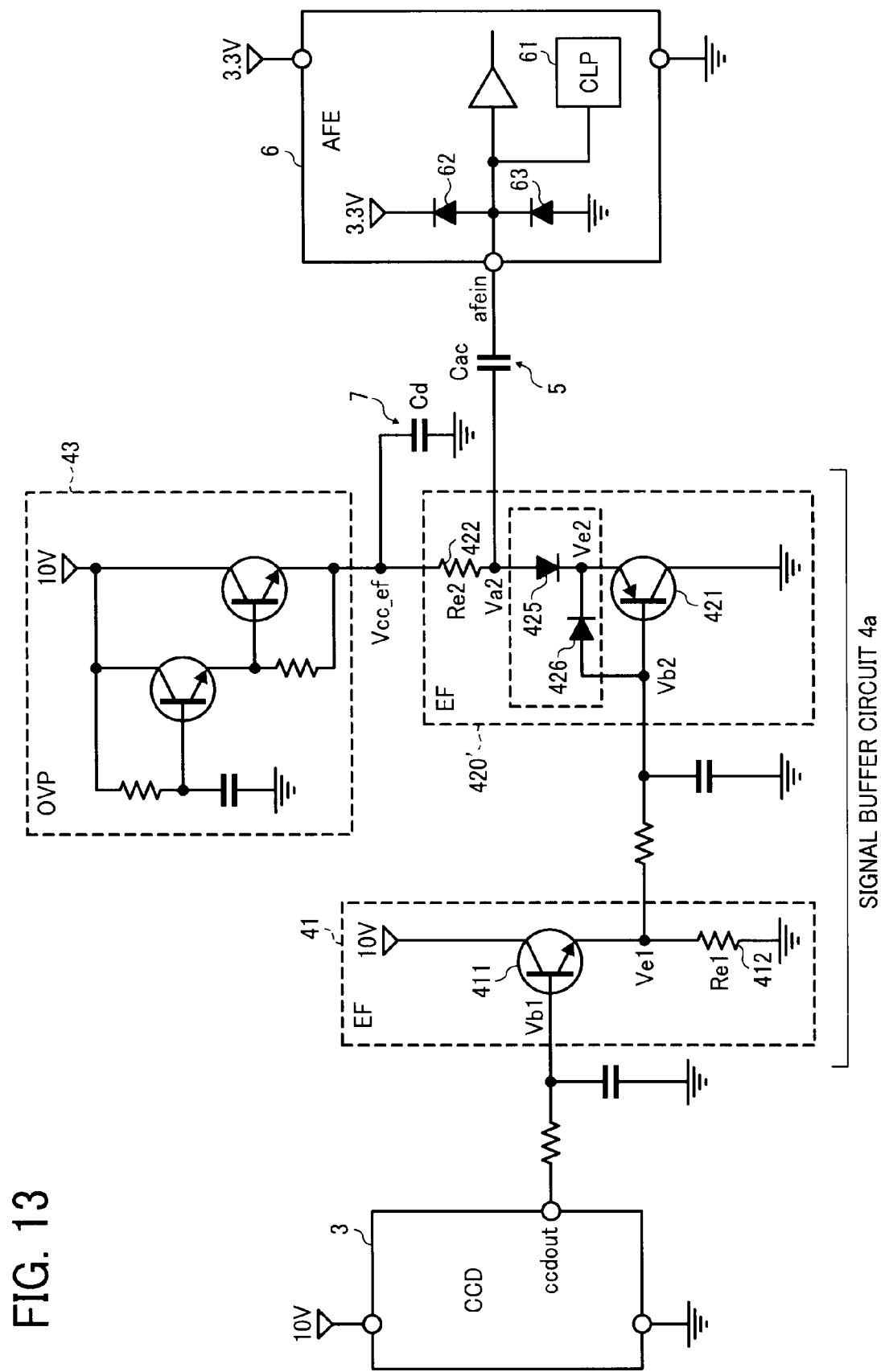
FIG. 13 shows a circuit diagram of a main circuit of sensor control board having the signal buffer circuit employing the EF of FIG. 11.

FIG. 13 shows a circuit diagram of a main circuit of sensor control board having a signal buffer circuit 4a employing the EF 420' of FIG. 11, and same reference characters and numbers in FIGS. 4 and 11 are used for the same parts in FIG. 13. Such main circuit can be mounted in the sensor control board shown in FIG. 1.

The sensor control board having the main circuit shown in FIG. 13 uses the signal buffer circuit 4a employing the EF 420' shown in FIG. 11, by which the over-voltage at the EF 420' and over-voltage/over-current to the AFE 6 can be prevented simultaneously with irrelevant to the signal changing speed. Further, a decoupling capacitor (Cd) 7 is disposed or interposed between the power source supply side of the EF 420' and GND. The decoupling capacitor may be simply referred to as capacitor.

By connecting the diode 425 to the emitter of the pnp transistor 421 disposed for the EF 420', the voltage Va2 (direct current voltage) before the AC coupling is increased for an amount of the forward voltage Vf of the diode 425, thereby the idle current (offset current) to the EF 420' becomes small (by changing an operation point of the pnp transistor 421), in which frequency number characteristics may deteriorate.

Under such situation, the resistance Re2 of the emitter resistor 422 needs to be decreased to maintain the idle current of the EF 420'. However, if the resistance Re2 is set too small, the change of emitter current of the EF 420' (pnp transistor 421) with respect to the amplitude of output signal the CCD 3 becomes great, by which the linearity of EF 420' deteriorates, and image signal property deteriorates. Therefore, the resistance Re2 cannot be set too small. Further, the diodes 425 and 426 may be a part of OVP. Further, the EF 420' of FIG. 13 can be changed to the EF 420 shown in FIG. 8.

Figure 14:
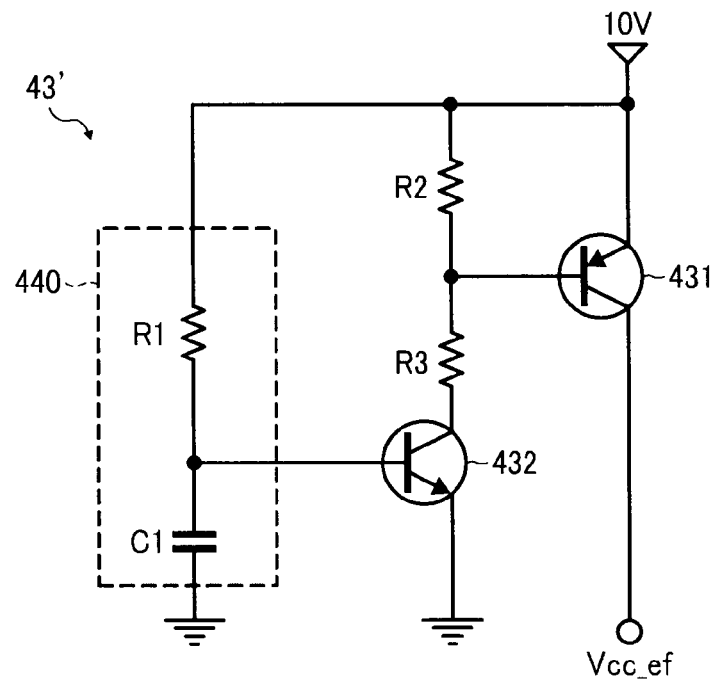
FIG. 14 shows a circuit diagram of a first example of OVP, which is improved from an OVP of FIG. 13.

FIG. 14 shows a circuit diagram of an OVP 43', which is a first example improved from the OVP 43 of FIG. 13. The above described linearity deterioration of the EF 420' occurs because the voltage difference between the both ends of the resistance Re2 of the emitter resistor 422 becomes small due to the forward voltage of the diode 425 used for preventing the opposite bias voltage as shown in FIG. 13. Further, the emitter follower configuration using a Darlington pair for the OVP 43 also causes the above described linearity deterioration of the EF 420', in which the Vcc_ef decreases for the two stages of base-emitter voltage of the pnp transistor 421 (typically 0.6 V to 0.8 V) with respect to the 10 V.

In view of such situation, instead of the emitter follower of the OVP 43 of FIG. 13 using the Darlington pair, the OVP 43' shown in FIG. 14 uses a simple switching device to prevent deterioration linearity of the EF 420'. Specifically, a simple switching device is used to conduct the ON/OFF control of power source Vcc_ef (i.e., OVP 43') for the EF 420', by which a configuration that can be shut down the EF 420' can be devised. Specifically, instead of using the Darlington pair for the emitter follower shown in FIG. 13, the OVP 43' includes a transistor 431 to function as a first switching device, and a transistor 432 to function as a second switching device as shown in FIG. 14. The transistor 431 is used for the ON/OFF control of Vcc_ef, and the transistor 432 is used for ON/OFF control of the transistor 431 using a delay signal of the power source 10V. The OVP 43' functions as a buffer control circuit, which controls the buffer circuit.

When the power source 10V is input or supplied to the OVP 43', the base voltage of the transistor 432 is delayed with respect to the 10V using a resistor-capacitor (RC) circuit 440 having a resistance R1 and a capacitance C1, by which the transistor 432 can gently shifts from OFF to ON (OFF→ON). Similarly, the transistor 431 can also gently shifts from OFF to ON (OFF→ON), and then the transistor 431 can be set at the ON condition stably.

When the transistor 431 is completely set at the ON condition, a voltage decrease of the Vcc_ef is determined by subtracting the collector-emitter voltage (0.3 V or so at most) from the voltage of 10V, by which the Vcc_ef becomes substantially 10V.

Therefore, compared to the emitter follower configuration using the Darlington pair, the Vcc_ef can be set at a high level for the OVP 43'. Therefore, even if the diode 425 used for preventing the opposite bias voltage is connected as shown in FIG. 13, without narrowing the voltage difference between the both end of the emitter resistor 422 (resistance Re2), the resistance Re2 of the resistor 422 can be maintained at a given level or set at a greater level. Therefore, the linearity deterioration of the EF 420' can be prevented or the linearity of the EF 420' can be enhanced.

As similar to the OVP 43 of FIG. 13, the base voltage of the transistor 432 is delayed using the RC circuit 440 (R1, C1) so that the transistor 432 and the transistor 431 can shift from OFF to ON gently when the power source is input or supplied to the OVP 43' and so that the voltage change of Vcc_ef is suppressed to prevent the over-voltage at the AFE 6.

Further, as similar to the emitter follower configuration using the Darlington pair for the OVP 43 of FIG. 13, the transistor 431 is set to the saturated condition to decrease the impedance and used to prevent the crosstalk between channels. The over-voltage at the EF 420' and over-voltage/over-current at the AFE 6 can be suppressed as similar to the case of FIG. 12.

As such, the above described OVP 43' includes the transistor 431 (first switching device) to conduct the ON/OFF control of power source supply to the EF 420', and the transistor 432 (second switching device) to conduct the ON/OFF control of the transistor 431, and such transistors 431 and 432 can be configured as a buffer control circuit. When such buffer control circuit is used to conduct the ON/OFF control of the EF 420', the opposite bias voltage at the EF 420' and the over-voltage/over-current at the AFE 6, which may occur due to output signals from the CCD 3, can be suppressed.

Further, by controlling the transistor 432 using the delay signal of power source, the deterioration of the linearity of the EF 420' (or linearity of image data) can be prevented. Further, by controlling the ON/OFF control of the transistor 431 using a control signal (delay signal) from the transistor 432, the circuit size may not be increased, and further, functional fluctuation among devices can be reduced.

Figure 15:
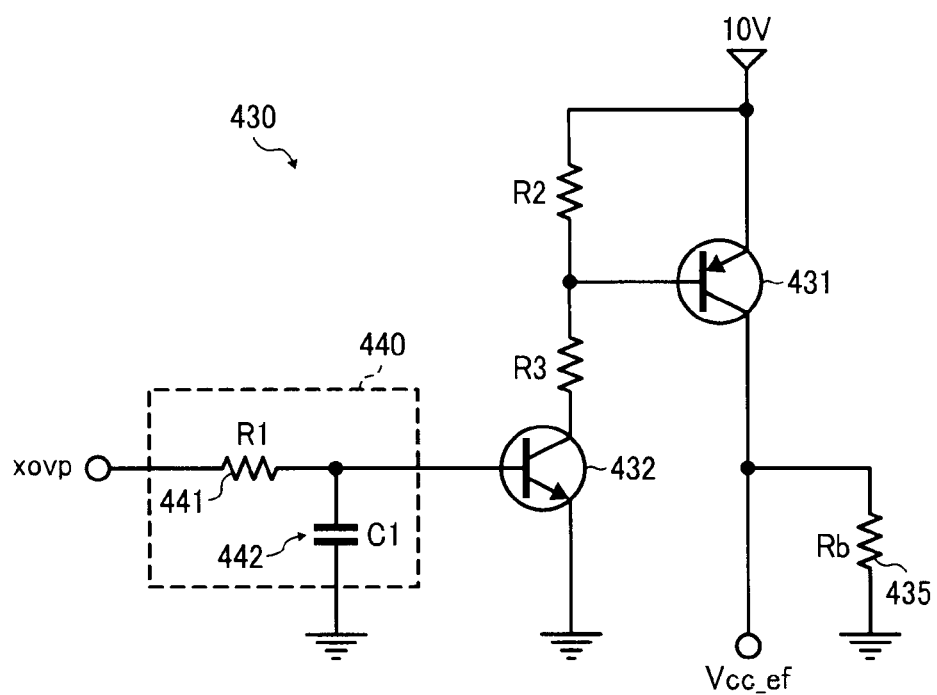
FIG. 15 shows a circuit diagram of a second example of OVP, which is improved from an OVP of FIG. 13.
Figure 16:
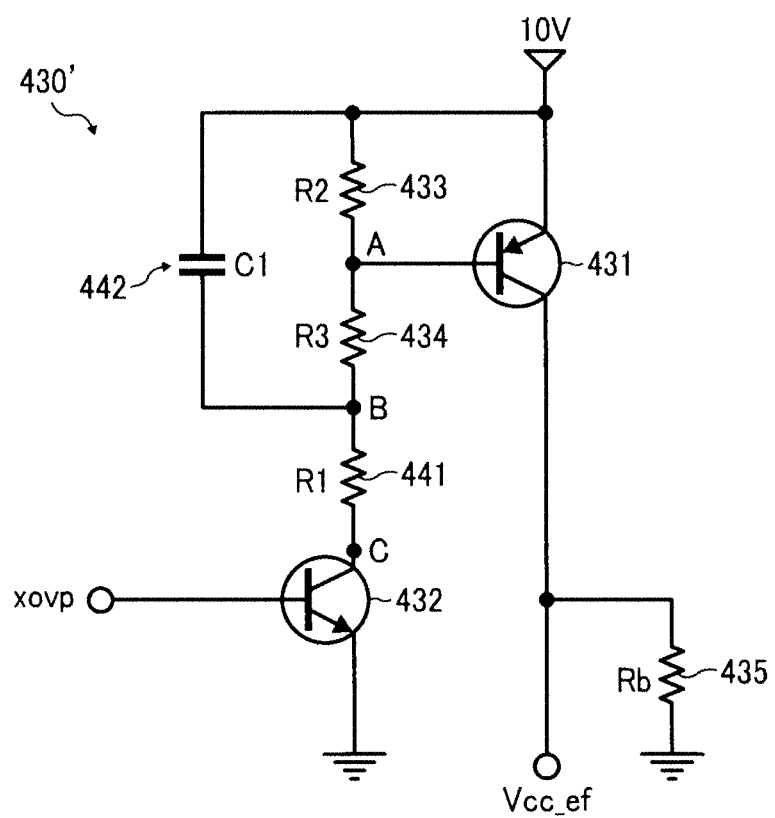
FIG. 16 shows a circuit diagram of a third example of OVP, which is improved from an OVP of FIG. 13.

A description is given of another OVP with reference to FIG. 15 and FIG. 16. FIG. 15 shows a circuit diagram of an OVP 430, which is a second example improved from the OVP 43 of FIG. 13, and FIG. 16 shows a circuit diagram of an OVP 430', which is a third example improved from the OVP 43 of FIG. 13. Same reference characters and numbers in FIG. 14 are used for the same parts in FIGS. 15 and 16.

As shown in FIG. 12, the opposite bias voltage to the EF 41 and the EF 420' can be prevented during operations from the power source ON to the power source OFF, but the over-voltage to the AFE 6 after the time period of POR cannot be still prevented. This is caused because the ON/OFF control of EF 420' is conducted by a delay circuit such as RC circuit 440, and there is a limit to set a long time for the delay time as described with reference to FIG. 5.

In view of such situation, instead of using the configuration shown in FIG. 14 that the OVP 43' controls the transistor 431 (switching device) using the delay signal of power source, another configuration is shown in FIG. 15. In the configuration of the OVP 430 of FIG. 15, the ON/OFF controlled of EF 420' is conducted using a control signal referred to as "xovp" which is a delay signal controllable at a given timing to prevent the over-voltage/over-current in a time period from the power source ON to the normal condition establishment.

In the configuration of FIG. 15, the xovp is, for example, a negative signal. When the xovp is Low, the transistors 431 and 432 are set at the OFF condition (over-voltage protection mode), and when the xovp is High, the transistors 431 and 432 are set at the ON condition (normal operation mode). The xovp may use a signal output from the TG 1 to conduct the ON/OFF control of Vcc_ef (i.e., EF 420') at given timing.

For example, from the power source ON to the initial setting, the xovp is set at Low to set the EF 420' at the OFF condition, and when the condition shifts to the normal operation condition (scan-waiting condition), the xovp is set at High to set the EF 420' at the ON condition. With such a configuration, the over-voltage at the AFE 6 during the time period from the power source ON to the initial setting can be prevented. As for the OVP 430, the xovp can be delayed by the RC circuit 440, and such delay signal is used to control the transistor 432 to gently increase the Vcc_ef.

As such, the OVP 430 includes the transistor 431 to control the ON/OFF control of power source supply to the EF 420' and the transistor 432 to control the ON/OFF control of the transistor 431, and the transistors 431 and 432 configure a buffer control circuit which conducts the ON/OFF control of the EF 420'. With such a configuration, the opposite bias voltage at the EF 420' caused by the output signal output from the CCD 3 and the over-voltage/over-current at the AFE 6 can be suppressed.

Further, by controlling the transistor 432 using a delay signal "xovp" controllable at a given timing, the opposite bias voltage at the EF 420' and the over-voltage/over-current at the AFE 6 which may occur when shifting from the power source ON to the normal condition can be also suppressed. Further, by conducting the ON/OFF control of the transistor 431 using a delay signal, which is a control signal transmitted from the transistor 432, the circuit size is not increased, and further, functional fluctuation among devices can be reduced.

However, in the OVP 430, because the voltage that can set the transistor 432 at the ON condition is low such as the base-emitter voltage (0.7 V or so) compared to the xovp having 3.3V amplification (power source of TG 1), the time constant of the RC circuit 440 needs to be set at a greater value.

Further, to gently raise the Vcc_ef, the collector current of transistor 431 needs to raise gently, and to gently raise the collector current of transistor 431, the base current of transistor 431 needs to raise gently, and to gently raise the base current of transistor 431, the collector current of transistor 432 needs to raise gently, and to gently raise the collector current of transistor 432, the base current of transistor 432 needs to raise gently. As such, the base current of transistor 432 is gently changed so that the Vcc_ef can be raised gently.

However, with the effect of the current amplification ratio (hfe) of the transistors 432 and 431, in an actual case, when the base-emitter voltage reaches a certain voltage such as 0.5V before completely raised to the ON condition, the transistor 431 is set to the ON condition. As such, even if the transistor 432 is not yet completely set at the ON condition (or saturated condition), with the current amplification effect, the transistor 432 induces the base current from the transistor 431, and similarly a tiny base current flows a collector current in the transistor 431. Therefore, to gently raise the Vcc_ef, the time constant of RC circuit 440 needs to be set about several tens of times of usual level, in which the circuit size and functional fluctuation among devices may deteriorate.

In view of such situation, the resistor 441 having the resistance R1 and the capacitor 442 having the capacitance C1 used as the RC circuit 440 in FIG. 15 are used differently in the configuration shown in FIG. 16. Specifically, the resistor 441 and the capacitor 442 are connected in the OVP 430' as shown in FIG. 16. Specifically, the resistor 441 is interposed between the collector of the transistor 432 and one end of a resistor 434, and the capacitor 442 is disposed in a parallel manner with respect to the resistors 433 and 434, in which the capacitor 442 is disposed between the power source (10V) and the resistor 441. The xovp is directly input to the base of the transistor 432.

After the power source ON operation is initiated, in the OVP 430', the transistor 432 is at the OFF condition until the transistor 432 shifts from OFF to ON (OFF→ON), in which the voltage at each of points A, B, and C is maintained at the same potential of the power source (10V).

When the transistor 432 is set at the ON condition using the xovp under such condition, the transistor 432 becomes the saturated condition, and the voltage at the point C decreases to the GND voltage. At this time, the charging to the capacitor 442 having the capacitance C1 starts. However, because the voltage at the point B is still maintained at 10V, the current does not flow to the resistor 434 having the resistance R3, which means the base current of the transistor 431 does not flow, and thereby the transistor 431 is at the OFF condition.

On one hand, a charge current flows to the capacitor 442 having the capacitance C1 via the resistor 441 having the resistance R1, and the voltage at the point B gently decreases. In response to such voltage decrease at the point B, the potential difference between the points A and B gradually increases, by which current flowing to the resistor 434 having the resistance R3 gradually increases, which means the base current of the transistor 431 gradually increases. Therefore, the collector current of transistor 431 can be gradually increased, by which the Vcc_ef can be gently increased (Actually, the collector current of transistor 431 gradually decreases when the Vcc_ef becomes a given voltage because the current flows to the capacitor 7 having decoupling capacitance Cd to charge the capacitor 7 shown in FIG. 13).

Compared to the OVP 430 of FIG. 15, in the OVP 430' of FIG. 16, the time constant of the RC circuit (R1, C1) composed of the resistor 441 and the capacitor 442 determines the voltage change at the point B. Because only the base voltage (and base current) of the transistor 431 is controlled with such configuration, and only the hfe of transistor 431 affects, the required time constant of RC circuit can be suppressed to a several times or so of usual level.

Further, as described previously, the Vcc_ef shown in FIGS. 15 and 16 may be connected to a plurality of channels. To prevent the crosstalk between the channels, the transistor 431 is set to the saturated condition at the normal condition to decrease the output impedance of Vcc_ef. Therefore, a gentle increase of Vcc_ef is difficult to attain by connecting a resistor to the collector of the transistor 431.

Further, a switching device for power source (high side switching device) may employ a pnp transistor, a positive channel metal oxide semiconductor (PMOS) transistor (hereinafter, PMOS) or the like, and the switching device is controlled by a signal that is used to set the ON condition when the signal is Low.

In the OVP 430' of FIG. 16, the transistor 431, which is a high side switching device, uses a pnp transistor, and the RC circuit (R1, C1) is used to delay a change of the base voltage of transistor 431. The RC circuit includes the capacitor 442 having the capacitance C1, which is connected to the power source (10V). The RC circuit generates a delay signal for the ON/OFF control of the transistor 431.

Such a configuration is employed to effectively set the OFF condition for the Vcc_ef. For example, such configuration is used when to set the Vcc_ef at the OFF condition right after the power source is input. In contrast, if the capacitor 442 having the capacitance C1 is connected to GND, current flows from the base of the transistor 431 as a charge current for the capacitor 442, by which the Vcc_ef becomes the ON condition.

As such, by disposing the RC circuit composed of the resistor 441 and the capacitor 442 that can generate a delay signal to control the ON/OFF condition of the above described first switching device, by using a pnp transistor or a PMOS for the transistor 431, and by connecting the capacitor 442 to the power source 10V, the EF 420' can be effectively set at the OFF condition right after the power source is input.

In the cases of OVP 430 of FIG. 15 and OVP 430' of FIG. 16, the xovp can be used to control the transistor 431. Therefore, the transistor 431 can be set to the OFF condition using the xovp while the power source of 10V is input.

Usually, the output end of Vcc_ef is connected to the capacitor 7 having the decoupling capacitance Cd as shown in FIG. 13. To decrease the voltage of Vcc_ef, the charges accumulated in the capacitor 7 need to be discharged. The discharge path follows the route of "emitter of pnp transistor 421 of EF 420'→base of pnp transistor 421 of EF 420'→emitter resistor 412 (resistance Re1)→GND." Therefore, for example, when the CCD 3 is outputting a signal of 5V while the power source 10V is at the ON condition, the discharge can be continued until the Vcc_ef reaches 5V because the above mentioned discharge path exists. However, when the Vcc_ef reaches 5V, the discharge path does not exist and the discharge stops.

Therefore, the Vcc_ef does not decrease from 5V, and the EF 420' cannot be completely set to the OFF condition (shut down). In view of such situation, in the OVP 430 of FIG. 15 and the OVP 430' of FIG. 16, the power source supply end of Vcc_ef is connected to a bleeder resistor 435 having the resistance Rb, by which the transistor 431 can be set at the OFF condition, and the EF 420' shown in FIG. 13 can be effectively shifted from the ON condition to OFF condition.

Figure 17:
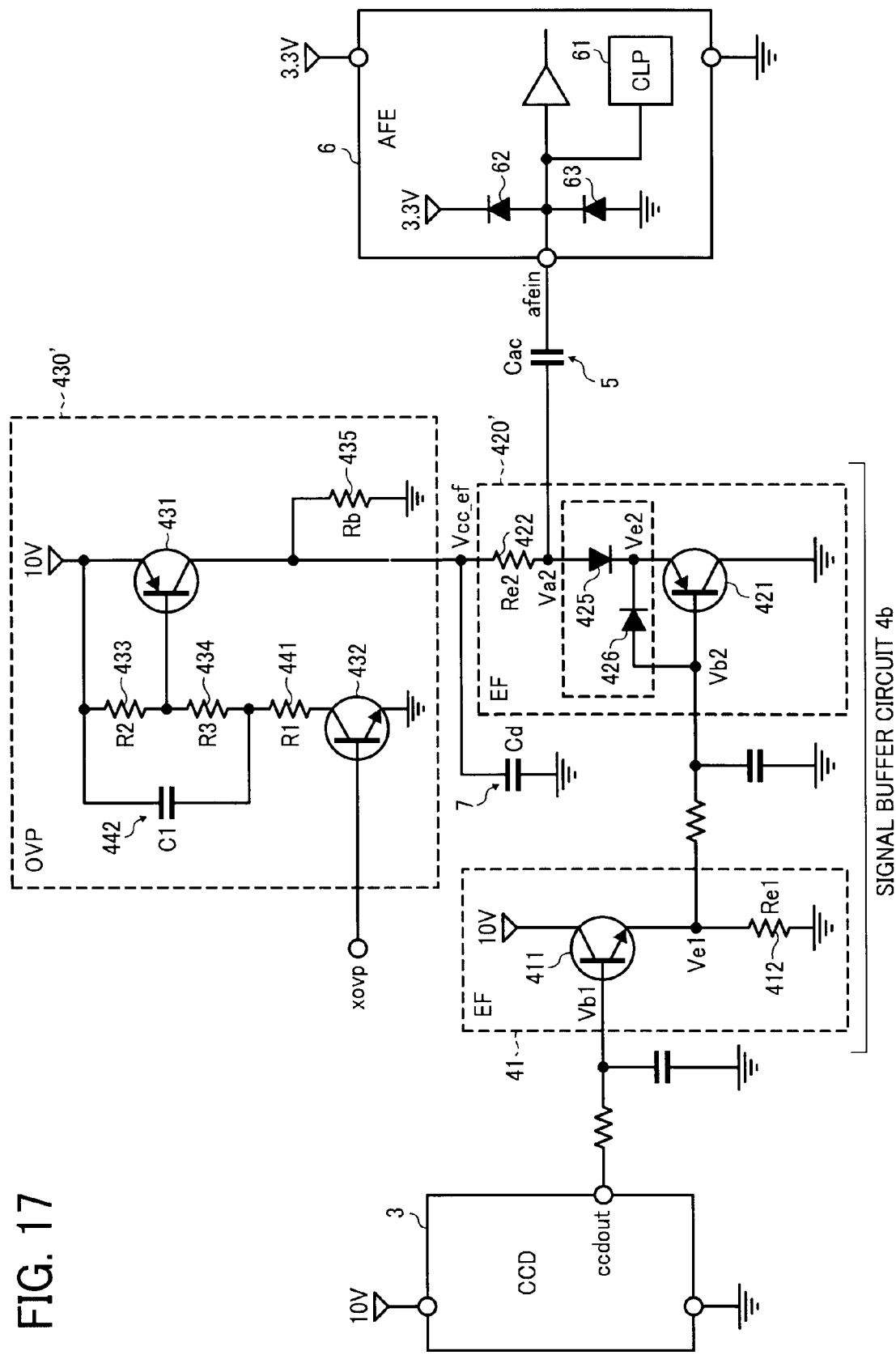
FIG. 17 shows a circuit diagram of main circuit of sensor control board having the signal buffer circuit employing the EF of FIG. 11 and the OVP of FIG. 16.

FIG. 17 shows a circuit diagram of main circuit of sensor control board having a signal buffer circuit 4b employing the EF 420' of FIG. 11 and the OVP 430' of FIG. 16, and same reference characters and numbers in FIGS. 13 and 16 are used for the same parts in FIG. 17. The main circuit may be mounted on the sensor control board shown in FIG. 1.

In the sensor control board having the main circuit shown in FIG. 17, by cancelling the xovp after the initial setting, the over-voltage at the EF 420' and the over-voltage/over-current at the AFE 6 during the time period from the power source ON to the initial setting can be prevented. The EF 420' shown in FIG. 17 can be replaced with the EF 420 shown in FIG. 8.

Figure 18:
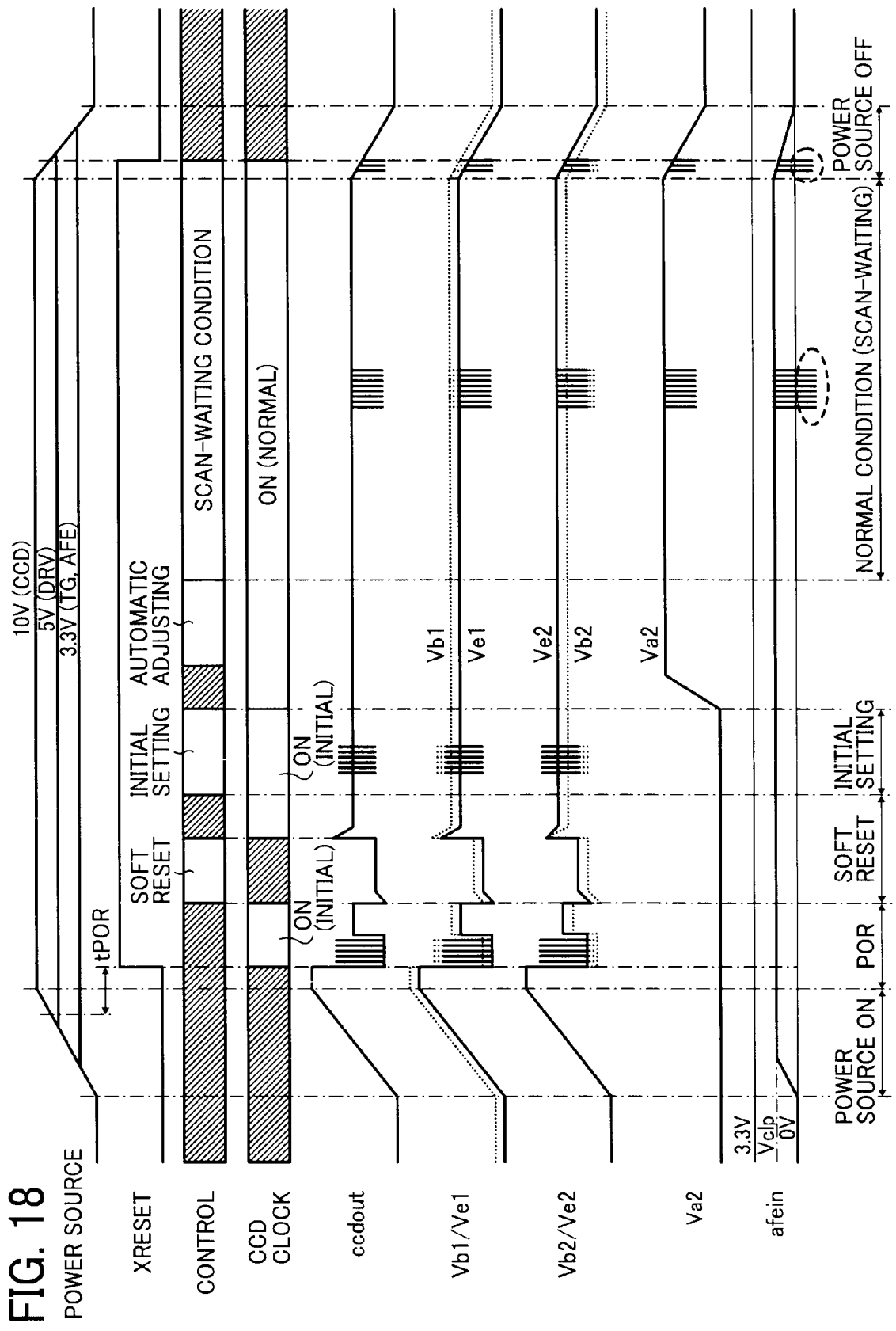
FIG. 18 shows a timing chart to explain voltage levels in the sensor control board having the main circuit of FIG. 17 through the operation sequence.

FIG. 18 shows a timing chart to explain voltage levels in the sensor control board (FIG. 1) having the main circuit shown in FIG. 17 through the operation sequence.

In the case of FIG. 12, the over-voltage/over-current at the AFE 6 occurs during the time period from the soft reset to the initial setting. In contrast, in the sensor control board having the main circuit of FIG. 17, the Vcc_ef can be set at the OFF condition using the xovp during the time period from the power source ON to the initial setting, by which the over-voltage/over-current does not occur at the AFE 6 during the time period from the power source ON to the initial setting as shown in FIG. 18. With such a configuration, the opposite bias voltage at the EF 420' and the over-voltage/over-current at the AFE 6 during the time period from the power source ON to the initial setting can be prevented.

Figure 19:
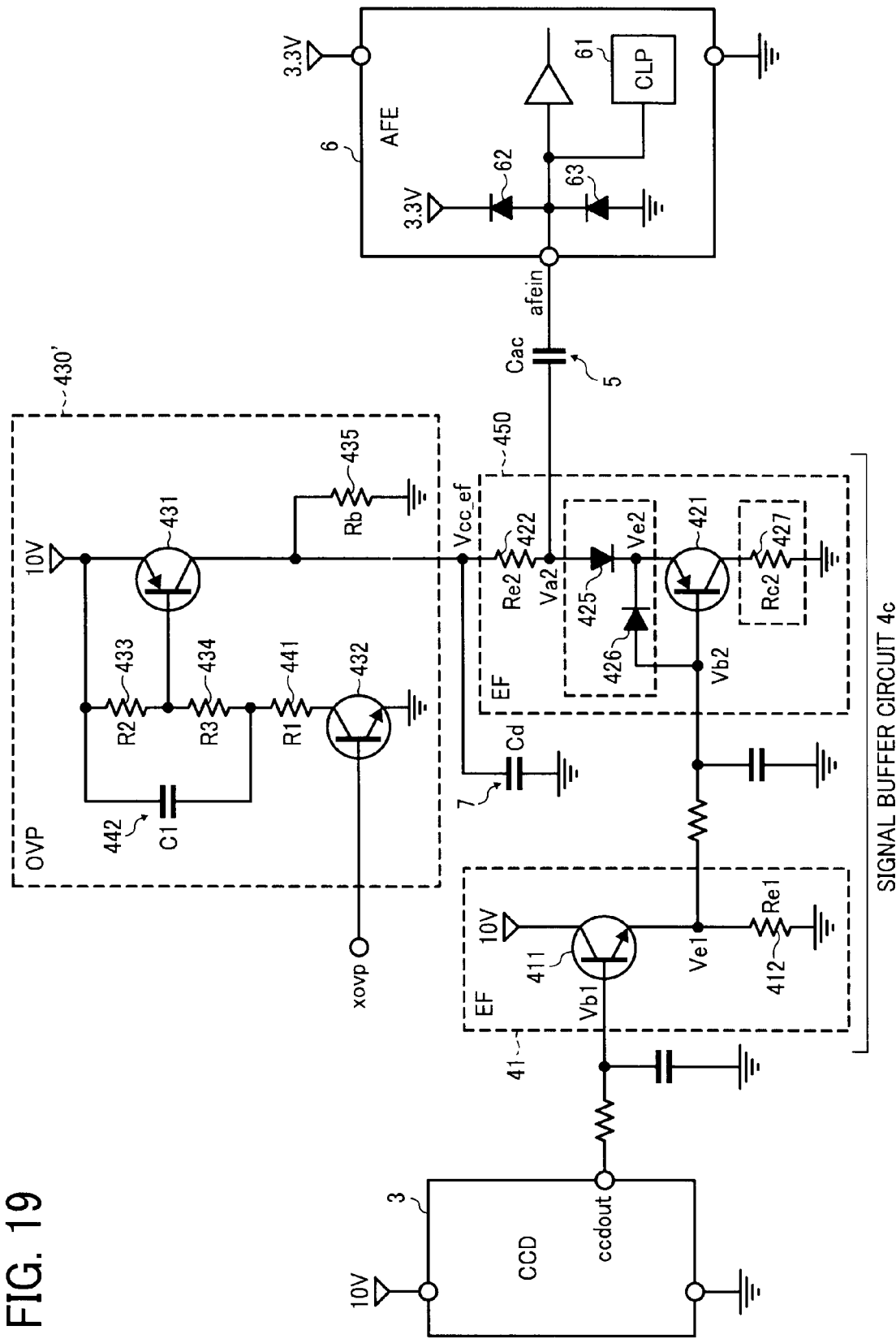
FIG. 19 shows a circuit diagram of main circuit of sensor control board having the signal buffer circuit having a circuit configuration slightly different from the signal buffer circuit of FIG. 17.

FIG. 19 shows a circuit diagram of main circuit of sensor control board having the signal buffer circuit 4c having a circuit configuration slightly different from the signal buffer circuit 4b of FIG. 17, and same reference characters and numbers in FIG. 17 are used for the same parts in FIG. 19. Such main circuit may be mounted in sensor control board of FIG. 1.

In the above described embodiments, the over-voltage which occurs during the time period from the power source ON to the initial setting has been discussed. However, the above described embodiments may not suppress the over-voltage at the AFE 6 when an irregular light enters during the normal condition (scan-waiting condition) or power source OFF condition.

This is because no specific control is conducted or specific control cannot be conducted during the time period of the normal condition and power source OFF. Further, the suppression of the over-voltage is difficult because the power source OFF condition needs to be detected with a high precision. Therefore, the over-voltage during the power source OFF cannot be controlled by shutting down the output signal output from the CCD 3, but it is configured not to occur the over-voltage/over-current even if a signal that may cause the over-voltage is input.

In view of such situation, in the sensor control board having the main circuit of FIG. 19, a resistor 427 having resistance Rc2 is disposed between the collector of pnp transistor 421 and GND in an EF 450 as a current limiting circuit, which may be also called as a collector resistor or a current limiting resistor. By limiting the input/output current and also the voltage for the AFE 6 using the resistor 427, the over-voltage/over-current at the AFE 6 can be suppressed. Specifically, by employing the EF 450 for the signal buffer circuit 4c, the over-voltage/over-current at the AFE 6 during the scan-waiting condition and the power source OFF can be prevented. Further, the EF 450 of FIG. 19 can be replaced with the EF 420 of FIG. 8, in which the resistor 427 having the resistance Rc2 can be disposed or interposed between the collector of transistor 421 and GND.

Figure 20:
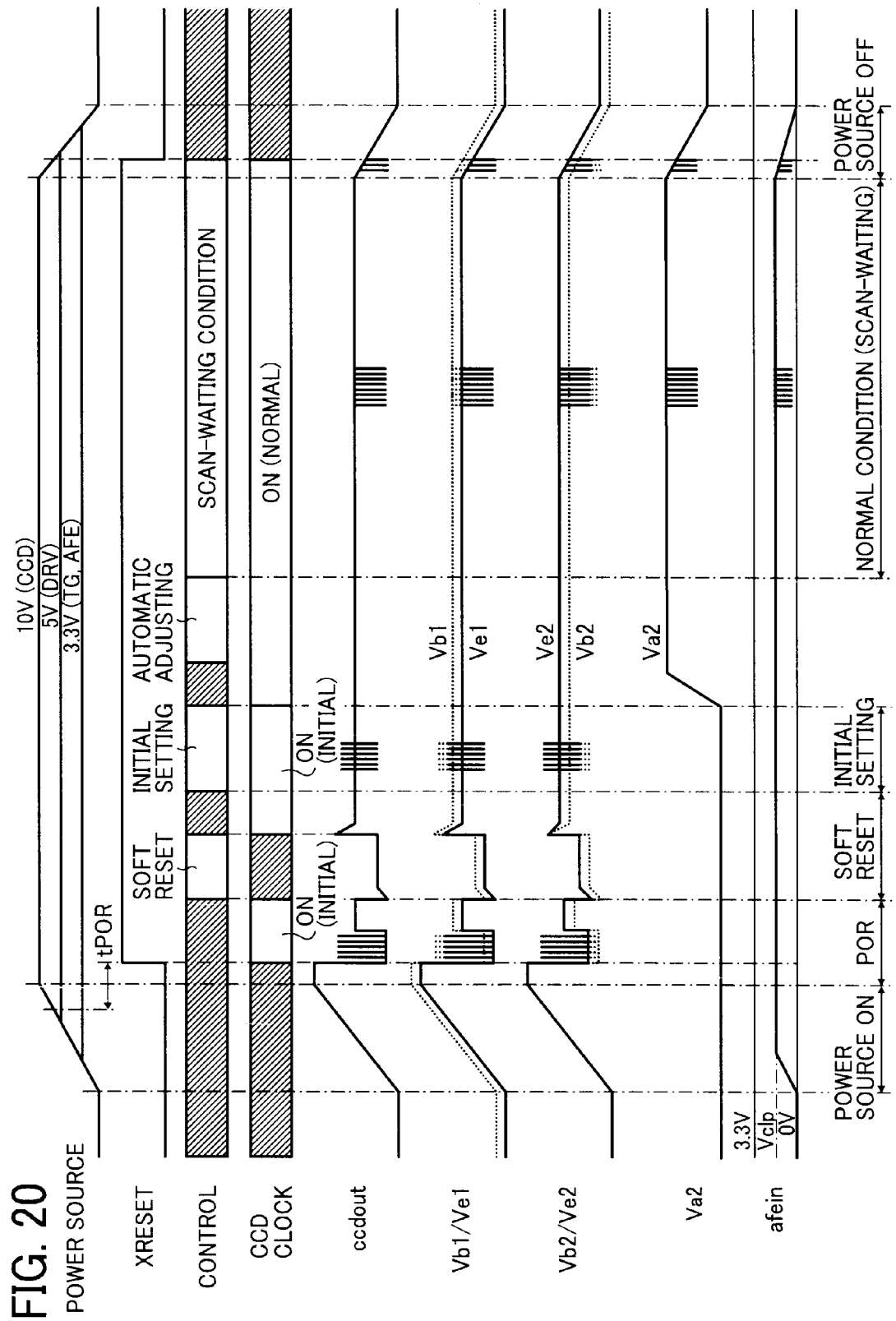
FIG. 20 shows a timing chart to explain voltage levels in the sensor control board having the main circuit shown in FIG. 19 through the operation sequence.

FIG. 20 shows a timing chart to explain voltage levels in the sensor control board (FIG. 1) having the main circuit shown in FIG. 19 through the operation sequence.

When an irregular light enters under the normal condition (or scan-waiting condition), the ccdout, Vb1, and Ve1 behave as similar to the above described example embodiments.

However, if an over-output signal occurs at the AFE 6 such as a great change to the negative side (− side) at the AFE 6, the protection diodes 62 and 63 in the AFE 6 (FIG. 19) becomes the ON condition, and then the over-current flows from the AFE 6 to the EF 450. At this time, most of the current from the AFE 6 flows to the resistor 427 having the resistance Rc2 (current limiting resistor), by which the pnp transistor 421 in the EF 450 becomes the saturated condition gradually.

When the pnp transistor 421 becomes the saturated condition completely, the current does not flow anymore to the collector side of the pnp transistor 421 but flows to the emitter resistor 412 having the resistance Re1 in the EF 41 via the base of the pnp transistor 421. The emitter resistor 412 is disposed to determine the idle current of the npn transistor 411 of the EF 41, and the resistance Re1 of the emitter resistor 412 is typically 1 kΩ or so. Therefore, the current bypassed to the base of the pnp transistor 421 in the EF 450 flows only for a several milliamperes (mA), by which the current from the AFE 6 can be restricted.

Therefore, the input voltage to the AFE 6 is also limited or restricted, by which the over-voltage/over-current at the AFE 6 can be suppressed. The current limitation by the resistor 427 having the resistance Rc2 (current limiting resistor) is effective to prevent the over-voltage/over-current at the AFE 6 at the negative side (− side), but not effective at the positive side (+ side). However, the over-current at the positive side (+ side) can be restricted or limited by the emitter resistor 422 having the resistance Re2 (e.g., up to 1 kΩ) of the EF 450, and thereby the over-voltage/over-current at the AFE 6 at the positive side (+ side) may not become a problem.

Figure 21:
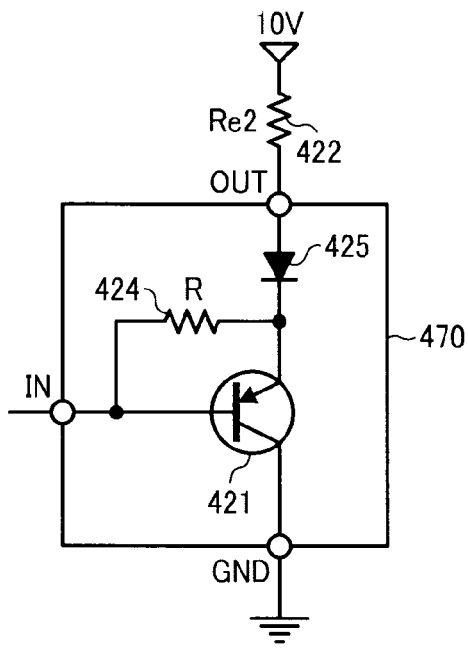
FIG. 21 shows a circuit diagram of a semiconductor chip having integrated a transistor and a diode on the same chip.
Figure 22:
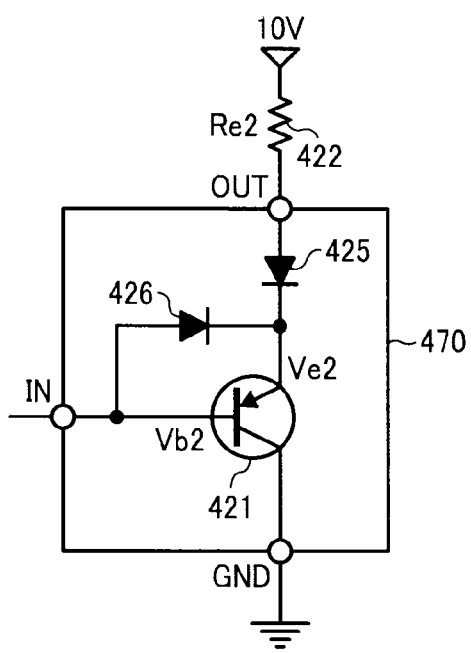
FIG. 22 shows a circuit diagram of a semiconductor chip having integrated a transistor and diodes on the same chip.

FIG. 21 shows a circuit diagram of a semiconductor chip having integrated a transistor and a diode (EF 420 of FIG. 8) on the same chip, and FIG. 22 shows a circuit diagram of a semiconductor chip having integrated a transistor and diodes (EF 420' of FIG. 11) on the same chip. As shown in FIG. 21 and FIG. 22, by disposing the EF 420 (FIG. 8) or the EF 420' (FIG. 11) on one semiconductor chip 470, saving of space and saving of cost can be achieved. Although a pnp transistor is used in FIGS. 21 and 22, a npn transistor can be used with a similar effect.

The above example embodiments describe the sensor control board mountable to scanners to read or scan document image using a CCD and the internal circuit of the sensor control board. However, the present invention is not limited such configuration. For example, the present invention can be applied to a sensor control board mountable to scanners to read or scan document image using other image sensor and internal circuit. Further, such sensor control board using other image sensor and the internal circuit can be used for an image scanner, and further, such image scanner can be disposed for image forming apparatuses such as digital copiers, facsimile machines, and printers. Such image forming apparatuses can print out image data scanned by the image scanners on a print medium as a visible image. Further, the above described circuit configurations of example embodiments can be applied to other drive circuit to drive a load device (such as a motor) other than an image sensor, and such drive circuit can be mounted on a control board, and such control board can be applied for electronic apparatuses such as image scanners and image forming apparatuses but the apparatuses are not limited thereto. By incorporating the control board and internal circuit of the present invention, electronic apparatuses such as image scanners and image forming apparatuses can be operated stably with an enhanced reliability.

Figure 23:
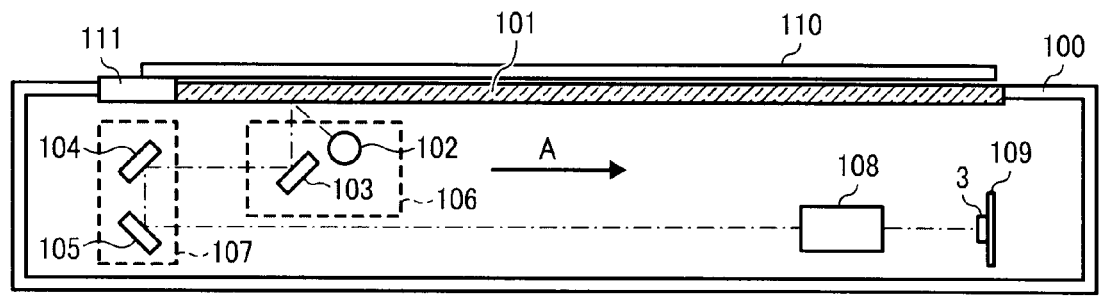
FIG. 23 shows a schematic configuration of a scanner employing the sensor control board according to example embodiments.

FIG. 23 shows a schematic configuration of a scanner 100 employing the sensor control board according to the above described example embodiments, and same reference characters and numbers in FIG. 13, FIG. 17, and FIG. 19 are used for the same parts in FIG. 23 such as CCD 3. The scanner 100 may be a flat bed type, which includes a contact glass 101 at a top face of the scanner 100 on which document is placed. Under the contact glass 101, a first carriage 106 and a second carriage 107 are disposed, wherein the first carriage 106 and second carriage 107 can move in a direction shown by an arrow A (in the sub-scanning direction) with a speed ratio of, for example, 2 to 1.

The first carriage 106 includes a halogen lamp 102 used as a light source and a first mirror 103. The second carriage 107 includes a second mirror 104 and a third mirror 105. The halogen lamp 102 irradiates light onto the document. The light reflected from the document is reflected at the first mirror 103, the second mirror 104, and the third mirror 105, and then enters a focus lens 108. The light is focused by the focus lens 108 on a focus face of CCD 3 used as a linear image sensor. The CCD 3 conducts the photo-electric conversion to generate analog electrical signals, and the analog electrical signals are converted to digital image data (document image data) by a sensor control board 109 of the present invention, and the digital image data is transmitted to subsequent units.

To secure a uniform distribution of document image data in the main scanning direction, which is perpendicular to the sub-scanning direction, a shading correction is required, in which scanning data of a white platen 111 needs to be obtained. The shading correction can be conducted as follows. Before scanning document image, the halogen lamp 102 irradiates light onto a surface of the white platen 111 to scan the surface of white platen 111, and based on such scanning result (scanning data), the shading correction for document image scanning can be conducted.

The first carriage 106 and second carriage 107 can move in the sub-scanning direction with a speed ratio of 2 to 1 to secure the light path length from the document face to the focus face of the CCD 3 at a constant level, and the CCD 3 is mounted on the sensor control board 109. Further, a pressing plate 110 is disposed over the contact glass 101, wherein the pressing plate 110 can be opened and closed. After placing the document on the contact glass 101, the pressing plate 110 is closed so that no external light enters the CCD 3. Further, instead of the pressing plate 110, an automatic document feeder (ADF) or an automatic reversing document feeder (ARDF) can be disposed to automatically feed document.

Figure 24:
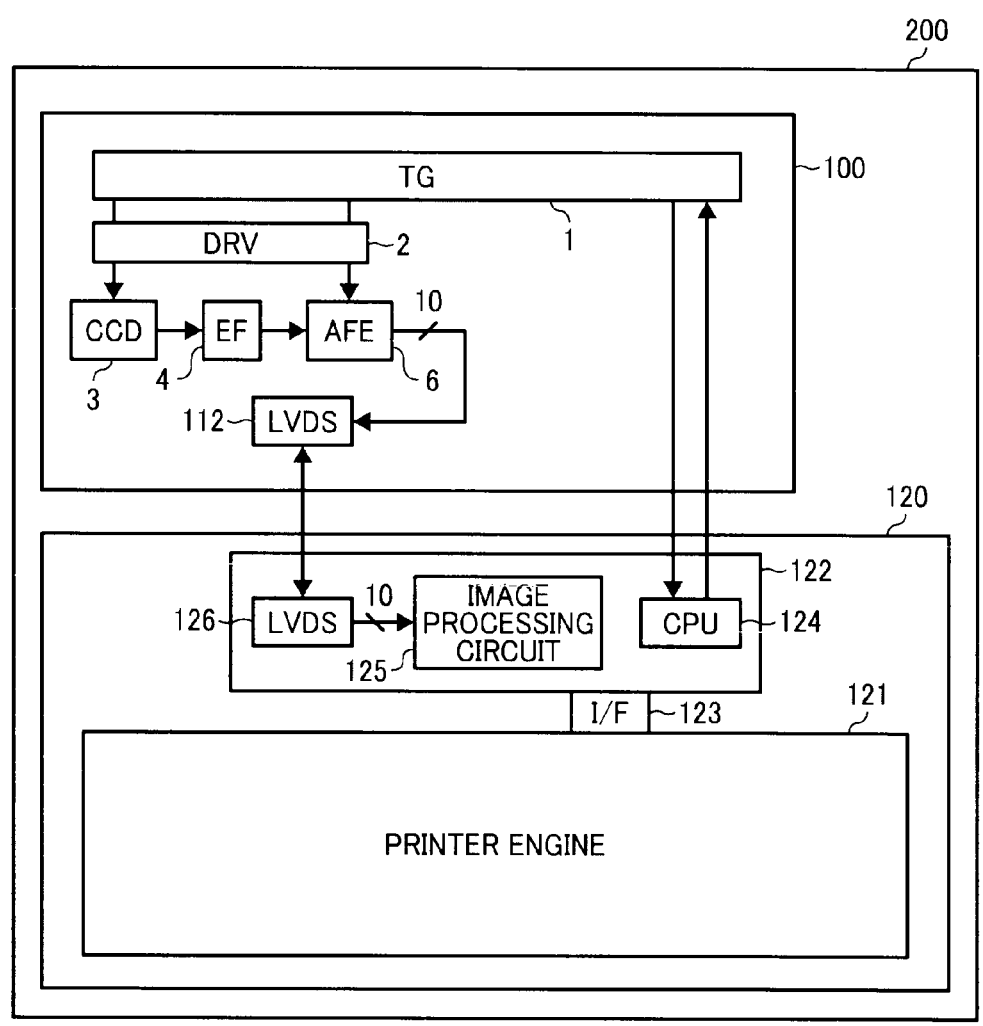
FIG. 24 shows a schematic configuration of image forming apparatus having a scanner employing a sensor control board according to example embodiments.

FIG. 24 shows a schematic configuration of an image forming apparatus 200 having a scanner employing a sensor control board of above described example embodiments, and same reference characters and numbers in FIG. 13, FIG. 17, FIG. 19, and FIG. 23 are used for the same parts in FIG. 24. The image forming apparatus 200 includes a scanner 100 and a printer 120. The scanner 100 includes a sensor control board of the present invention having the TG 1, the CCD driver 2, the CCD 3, the signal buffer circuit 4a, 4b, 4c, the AFE 6, and a low voltage differential signaling (LVDS) 112, in which 10-bit digital image data is transmitted from the AFE 6 to the LVDS 112.

The printer 120 includes a printer engine 121 and a control unit 122 to control the printer engine 121, and an interface (I/F) 123 connects the printer engine 121 and the control unit 122 to communicate information with each other. The control unit 122 includes a CPU 124, an image processing circuit 125, and a LVDS 126. The CPU 124 is connected with the TG 1 to communicate information with each other. Based on digital image data input via the LVDS 126, the CPU 124 controls the printer engine 121 to form images on a recording medium such as sheet. The image forming processes conduct-able by the printer engine 121 includes various types, and because any types of image forming processes can be conducted by a printer engine, the explanation of printer engine is omitted.

As above described, the over-voltage/over-current of AFE and EF can be suppressed using the above described example embodiment. By applying above described example embodiment to electronic devices or apparatuses such as scanners, image forming apparatuses (e.g., copier), electronic devices, apparatuses, or systems can be operated stably with an enhanced reliability.

As above described, the over-voltage to signal buffer circuit can be suppressed using the above described example embodiment. Therefore, signal buffer circuits, sensor control boards, image scanners, and image forming apparatuses that can suppress over-voltage can be devised.

In the above described example embodiment, a signal buffer circuit includes a buffer, a resistor, and a variable impedance device, wherein the resistor is connected between the input side and output side of the buffer, and the variable impedance device is connected to the output side of the buffer in a serial manner. The variable impedance device becomes a low impedance condition when the buffer is conducting a buffering operation, and the variable impedance device becomes a high impedance condition when the buffer does not conduct a buffering operation, by which the over-voltage to the signal buffer circuit can be suppressed.

In the above described another example embodiment, a signal buffer circuit includes a buffer, a first variable impedance device, and a second variable impedance device, wherein the first variable impedance device is connected between the input side and output side of the buffer, and the second variable impedance device is connected to the output side of the buffer in a serial manner.

The first variable impedance device becomes a high impedance condition when the buffer is conducting a buffering operation, and the first variable impedance device becomes a low impedance condition when the buffer does not conduct a buffering operation. The second variable impedance device becomes a low impedance condition when the buffer is conducting a buffering operation, and the second variable impedance device becomes a high impedance condition when the buffer does not conduct a buffering operation. With such a configuration, the over-voltage to the signal buffer circuit can be suppressed even if signals changes at a high speed.

In the above described another example embodiments, the over-voltage to the signal buffer circuit using an emitter follower circuit or the like can be suppressed even if the over-output/under-output or signal disruptions occurs to a load device such as CCD.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. Further, in the above-described exemplary embodiment, a storage device (or recording medium), which can store computer-readable program, may be a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, hard disk in a server, or the like, but not limited these. Further, a computer-readable program can be downloaded to a particular computer (e.g., personal computer) via a network such as the internet, or a computer-readable program can be installed to a particular computer from the above-mentioned storage device, by which the particular computer may be used for the system or apparatus according to an example embodiment, for example.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A signal buffer circuit, comprising:
   a buffer to buffer a signal that is input to an input terminal of the buffer and output, by an output terminal of the buffer, to a subsequent unit;
   a resistor connected between the input terminal and the output terminal of the buffer; and
   a variable impedance device connected in series to the output terminal of the buffer, so as to be connected between the output terminal of the buffer and the subsequent unit, wherein
   the variable impedance device is at low impedance when the buffer is buffering the signal during normal operation and at high impedance when the buffer is not buffering the signal when an opposite bias voltage occurs.

2. The signal buffer circuit of claim 1, wherein the signal buffer circuit is an emitter follower circuit, the resistor is an electrical resistor, and the variable impedance device is a diode.

3. A sensor control board, comprising:
an image sensor to conduct photo-electric conversion on an inputted signal and to output a photoelectrically converted signal;
the signal buffer circuit of claim 2 to receive the signal output from the image sensor and to transmit the signal to a subsequent unit;
an analog processing circuit to receive the signal from the signal buffer circuit to conduct signal processing including signal amplification and analog/digital (A/D) conversion of the received signal; and
a buffer control circuit to conduct an ON/OFF control of the emitter follower circuit.

4. The sensor control board of claim 3, wherein the buffer control circuit comprises:
a first switching device to conduct an ON/OFF control of power source supply to the emitter follower circuit; and
a second switching device to conduct an ON/OFF control of the first switching device,
wherein the second switching device is controlled by a power source delay signal.

5. The sensor control board of claim 3, wherein the buffer control circuit comprises:
a first switching device to conduct an ON/OFF control of power source supply to the emitter follower circuit; and
a second switching device to conduct an ON/OFF control of the first switching device, an ON/OFF control of the second switching device is controlled by a delay signal controllable at a given timing.

6. The sensor control board of claim 3, wherein the buffer control circuit includes
a first switching device to conduct an ON/OFF control of power source supply to the emitter follower circuit; and
a second switching device to conduct ON/OFF control of the first switching device,
an ON/OFF control of the second switching device is controlled by a signal controllable at a given timing, and the ON/OFF control of the first switching device is controlled by a delay signal, which is a control signal transmitted from the second switching device.

7. The sensor control board of claim 6, further comprising a resistor-capacitor (RC) circuit including an electrical resistor and a capacitor to generate the delay signal to conduct the ON/OFF control of the first switching device,
wherein the first switching device is one of a pnp transistor and a positive channel metal oxide semiconductor (PMOS) transistor, and the capacitor is connected to the power source.

8. The sensor control board of claim 3, wherein an electrical resistor is connected between a power source supply end of the emitter follower circuit and ground.

9. The sensor control board of claim 3, further comprising a current limiting circuit to limit an amount of input/output current of the analog processing circuit.

10. The signal buffer circuit of claim 2, wherein the electrical resistor and the diode are formed on a same semiconductor chip.

11. An image scanner comprising the sensor control board of claim 3.

12. An image forming apparatus comprising the image scanner of claim 11, wherein the image forming apparatus conducts image forming processing using image data scanned by the image scanner.

13. The signal buffer circuit of claim 1, wherein the resistor is an electrical resistor, and the variable impedance device includes a diode connected in parallel with a capacitor.

14. A signal buffer circuit, comprising:
a buffer to buffer a signal that is input to an input terminal of the buffer and output, by an output terminal of the buffer, to a subsequent unit;
a first variable impedance device connected between the input terminal and the output terminal of the buffer, wherein the first variable impedance device is at a high impedance when the buffer is buffering the signal during normal operation, and the first variable impedance device is at a low impedance when the buffer is not buffering the signal when an opposite bias voltage occurs; and
a second variable impedance device connected in series to the output terminal of the buffer, so as to be connected between the output terminal of the buffer and the subsequent unit, wherein the second variable impedance device is at a low impedance when the buffer is buffering the signal when an apposite bias voltage occurs, during normal operation and the second variable impedance device is at a high impedance when the buffer is not buffering the signal when the opposite bias voltage occurs.

15. The signal buffer circuit of claim 14, wherein the signal buffer circuit is an emitter follower circuit, and the first variable impedance device and the second variable impedance device are both diodes.

16. A sensor control board, comprising:
an image sensor to conduct photo-electric conversion on an inputted signal and to output a photoelectrically converted signal;
the signal buffer circuit of claim 15 to receive the signal output from the image sensor and to transmit the signal to a subsequent unit;
an analog processing circuit to receive the signal from the signal buffer circuit to conduct signal processing including signal amplification and analog/digital (A/D) conversion of the received signal; and
a buffer control circuit to conduct an ON/OFF control of the emitter follower circuit.

17. The signal buffer circuit of claim 15, wherein each of the diodes is formed on a same semiconductor chip.

18. The signal buffer circuit of claim 14, wherein:
the first variable impedance device connected between the input terminal and the output terminal of the buffer includes a first diode connected in parallel with a first capacitor; and
the second variable impedance device connected in series to the output terminal of the buffer includes a second diode connected in parallel with a second capacitor.

19. A signal buffer circuit, comprising:
a buffer to buffer a signal that is input to an input terminal of the buffer and output, by an output terminal of the buffer, to a subsequent unit;
first means connected between the input terminal and the output terminal of the buffer; and
second means connected in series to the output terminal of the buffer, so as to be connected between the output terminal of the buffer and the subsequent unit, wherein
the second means is at low impedance when the buffer is buffering the signal when an opposite bias voltage occurs during normal operation and at high impedance when the buffer is not buffering the signal when an opposite bias voltage occurs.

20. The signal buffer circuit of claim 19, wherein the first means is a resistor connected between the input terminal and the output terminal of the buffer, and the second means is a variable impedance device connected in series to the output terminal of the buffer.

21. The signal buffer circuit of claim 19,
wherein the first means is a first variable impedance device that is at a high impedance when the buffer is buffering the signal during the normal operation, and is at a low impedance when the buffer is not buffering the signal when the opposite bias voltage occurs, and
wherein the second means is a second variable impedance device.

* * * * *